US009824381B2

(12) United States Patent
Vaananen

(10) Patent No.: US 9,824,381 B2
(45) Date of Patent: *Nov. 21, 2017

(54) METHOD AND MEANS FOR BROWSING BY WALKING

(71) Applicant: Suinno Oy, Helsinki (FI)

(72) Inventor: Mikko Vaananen, Helsinki (FI)

(73) Assignee: SUINNO OY, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,900

(22) Filed: Apr. 5, 2016

(65) Prior Publication Data

US 2016/0217516 A1    Jul. 28, 2016

Related U.S. Application Data

(62) Division of application No. 14/266,848, filed on May 1, 2014, which is a division of application No.
(Continued)

(51) Int. Cl.
*G06F 17/30* (2006.01)
*G06Q 30/06* (2012.01)
*H04W 4/02* (2009.01)

(52) U.S. Cl.
CPC ..... *G06Q 30/0619* (2013.01); *G06F 17/3053* (2013.01); *G06F 17/3087* (2013.01);
(Continued)

(58) Field of Classification Search
CPC ......... G06F 17/30867; G06F 17/30864; G06F 17/30554; G06F 17/3053; G06F 17/3097;
(Continued)

(56) References Cited

U.S. PATENT DOCUMENTS 6,990,628 B1    1/2006    Palmer et al.
7,603,360 B2    10/2009    Ramer et al.
(Continued)

FOREIGN PATENT DOCUMENTS

CN    101470008    7/2009
CN    101566984    10/2009
(Continued)

OTHER PUBLICATIONS

China Office Action dated Mar. 10, 2016, with English Translation; Application No. 2011800694464.
(Continued)

*Primary Examiner* — Angelica Ruiz
(74) *Attorney, Agent, or Firm* — Young & Thompson

(57) ABSTRACT

A mobile station is arranged to determine its location, which is searched against street addresses from a database, and at least one matching street address is retrieved. The street address is searched on the mobile station and/or over the network. The search engine conducts a search in the mobile station file system and/or the Internet and/or a file system over the network with the at least one query term,—at least one search result is arranged to be displayed to user on the screen of the mobile station. This facilitates on-demand effortless Mobile Internet Search that allows the users to access opportunities that they did not know about, or would not have had time to find out about with minimum effort as the software of the mobile phone is scanning the Internet and information pages for these opportunities and displaying the results dynamically on the mobile phone screen.

32 Claims, 10 Drawing Sheets

Related U.S. Application Data

13/448,904, filed on Apr. 17, 2012, now Pat. No. 8,838,566, which is a division of application No. 13/448,800, filed on Apr. 17, 2012, now Pat. No. 8,577,860, which is a division of application No. 13/021,244, filed on Feb. 4, 2011, now Pat. No. 8,527,483.

(52) U.S. Cl.
CPC .. *G06F 17/30528* (2013.01); *G06F 17/30864* (2013.01); *H04W 4/02* (2013.01)

(58) Field of Classification Search
CPC ......... G06F 17/30657; G06F 17/30528; G06F 17/30761; G06F 17/30696; G06F 17/30716
See application file for complete search history.

(56) References Cited

U.S. PATENT DOCUMENTS

| | | | |
|---|---|---|---|
| 7,818,415 B2 | 10/2010 | Jhanji | |
| 7,822,823 B2 | 10/2010 | Jhanji | |
| 7,898,977 B2 | 3/2011 | Roese et al. | |
| 7,904,064 B2 * | 3/2011 | Frank | H04W 4/02 455/414.2 |
| 7,949,529 B2 | 5/2011 | Weider et al. | |
| 8,005,911 B2 | 8/2011 | Jhanji | |
| 8,364,525 B2 | 1/2013 | Kothiwal et al. | |
| 8,386,514 B2 | 2/2013 | Cheng et al. | |
| 8,554,611 B2 * | 10/2013 | Roberts | G06Q 30/02 705/14.1 |
| 8,588,815 B2 * | 11/2013 | Kenyon | H04W 4/02 455/456.1 |
| 2002/0123995 A1 | 9/2002 | Shibuya | |
| 2003/0216143 A1 | 11/2003 | Roese et al. | |
| 2003/0216144 A1 | 11/2003 | Roese et al. | |
| 2004/0186769 A1 | 9/2004 | Mangold et al. | |
| 2005/0080786 A1 | 4/2005 | Fish et al. | |
| 2005/0090294 A1 | 4/2005 | Narasimhan | |
| 2005/0288959 A1 | 12/2005 | Eraker et al. | |
| 2006/0184313 A1 | 8/2006 | Butler, Jr. | |
| 2007/0035400 A1 | 2/2007 | Lauper | |
| 2007/0050253 A1 | 3/2007 | Biggs et al. | |
| 2007/0061302 A1 | 3/2007 | Ramer et al. | |
| 2007/0100805 A1 | 5/2007 | Ramer et al. | |
| 2007/0136264 A1 | 6/2007 | Tran | |
| 2007/0143481 A1 | 6/2007 | Roxburgh et al. | |
| 2007/0162942 A1 | 7/2007 | Hamynen et al. | |
| 2007/0192315 A1 | 8/2007 | Drzaic et al. | |
| 2008/0005071 A1 | 1/2008 | Flake et al. | |
| 2008/0005104 A1 | 1/2008 | Flake et al. | |
| 2008/0122695 A1 | 5/2008 | Wang et al. | |
| 2008/0133336 A1 | 6/2008 | Altman et al. | |
| 2008/0139181 A1 | 6/2008 | Lokshin | |
| 2008/0140640 A1 | 6/2008 | Raff | |
| 2008/0172173 A1 | 7/2008 | Chang et al. | |
| 2008/0172357 A1 | 7/2008 | Rechis et al. | |
| 2008/0182564 A1 | 7/2008 | Frank et al. | |
| 2008/0249983 A1 | 10/2008 | Meisels et al. | |
| 2008/0252527 A1 | 10/2008 | Garcia | |
| 2008/0294629 A1 | 11/2008 | Gonen et al. | |
| 2009/0034630 A1 | 2/2009 | Cho et al. | |
| 2009/0088155 A1 | 4/2009 | Kim | |
| 2009/0171576 A1 | 7/2009 | Kim et al. | |
| 2009/0210495 A1 | 8/2009 | Wolfson et al. | |
| 2009/0287681 A1 * | 11/2009 | Paek | G06F 17/3064 |
| 2009/0299980 A1 | 12/2009 | Marcus | |
| 2009/0307318 A1 | 12/2009 | Chappell et al. | |
| 2010/0030743 A1 | 2/2010 | Lim et al. | |
| 2010/0036806 A1 | 2/2010 | Lam et al. | |
| 2010/0036807 A1 | 2/2010 | Lieske, Jr. et al. | |
| 2010/0191598 A1 | 7/2010 | Toennis et al. | |
| 2010/0217525 A1 | 8/2010 | King et al. | |
| 2010/0241507 A1 | 9/2010 | Quinn et al. | |
| 2010/0291952 A1 | 11/2010 | Gosset et al. | |
| 2010/0318535 A1 | 12/2010 | Weber et al. | |
| 2011/0083101 A1 | 4/2011 | Sharon et al. | |
| 2011/0087686 A1 * | 4/2011 | Brewer | G06F 17/3097 707/766 |
| 2011/0093340 A1 | 4/2011 | Kramer et al. | |
| 2011/0151842 A1 | 6/2011 | Olincy et al. | |
| 2011/0288962 A1 | 11/2011 | Rankin, Jr. et al. | |
| 2011/0320319 A1 | 12/2011 | Streich | |

FOREIGN PATENT DOCUMENTS

| | | |
|---|---|---|
| CN | 201732369 | 2/2011 |
| WO | 0239765 | 5/2002 |
| WO | 2009022356 | 2/2009 |
| WO | 2011020742 | 2/2011 |

OTHER PUBLICATIONS

China Search Report dated Mar. 10, 2016, with English Translation; Application No. 2011800694464.
Communication Relating to the Results of the Partial International Search, dated Mar. 7, 2012, corresponding application No. PCT/FI2011/051166.
International Search Report dated May 14, 2012 in International application No. PCT/FI2011/051166.
Extended European Search Report dated Oct. 7, 2016; Application No. 11857497.9.
China Office Action with English Translation dated Jan. 9, 2017; Application No. 2011800694464.
European Office Action dated Jan. 23, 2017; Application No. 11 857 497.9.
Office Action Restriction dated Mar. 1, 2012 in co-pending U.S. Appl. No. 13/021,244.
Office Action Non-Final dated May 10, 2012 in co-pending U.S. Appl. 13/021,244.
Office Action Final dated Jan. 3, 2013 in co-pending U.S. Appl. No. 13/021,244.
Office Action Non-Final dated Nov. 13, 2012 in co-pending U.S. Appl. No. 13/448,800.
Office Action Final dated Jun. 6, 2013 in co-pending U.S. Appl. No. 13/448,800.
Office Action Non-Final dated Dec. 6, 2012 in co-pending U.S. Appl. No. 13/448,904.
Office Action Final dated Jul. 9, 2013 in co-pending U.S. Appl. No. 13/448,904.
Office Action Non-Final dated Feb. 28, 2014 in co-pending U.S. Appl. No. 13/448,904.
Office Action Non-Final dated Apr. 7, 2016 in co-pending U.S. Appl. No. 14/266,848.
Office Action Final dated Sep. 22, 2016 in co-pending U.S. Appl. No. 14/266,848.
Office Action Non-Final dated Mar. 10, 2017 in co-pending U.S. Appl. No. 14/266,848.
Office Action Final dated Jul. 27, 2017 in co-pending U.S. Appl. No. 14/266,848.

* cited by examiner

METHOD AND MEANS FOR BROWSING BY WALKING

CROSS REFERENCE TO RELATED APPLICATIONS

This application is a division of copending application Ser. No. 13/021,244 filed on Feb. 4, 2011. The entire contents of each of the above-identified applications are hereby incorporated by reference.

TECHNICAL FIELD OF INVENTION

The invention relates to people browsing the Internet by walking to discover search results as they come near them. In more particular, the invention relates to browsing pages of information based on location and profile, and conducting "on the spot" commercial transactions that may involve payments.

BACKGROUND

Urbanisation and globalization progress inevitably every day. More and more companies and organizations offer their products over the Internet and offer fewer customer attendants on site. Further the commercial transactions are ever more complicated, with customer loyalty cards, credit cards, and ID cards all being swiped for one purchase of e.g. a sandwich.

On the other hand end customers move more and more each day. A typical sales representative in the EU might be in 5 different countries during a working week. With more mobile customers, and ever reduced investment to serve said customers there is a clear long felt need to develop technologies that would allow the customers to automatically access the services and products of companies or organisations, easily, right at the moment, right at the location, with minimum cost.

To address this need several mobile cellular techniques have been devised to purchase a product for consumption on site, without the customer addressing the service attendant. Perhaps one of the most successful practical technologies is the one developed in Helsinki Finland by Plusdial Oy for accessing public transport tickets. Nearly every tram in Helsinki has a mobile phone number on the wall of the tram, to which the customers can SMS a coded message, and one standard adult ticket will be sent by return SMS with the fee deducted from the phone bill. This system suffers from a major disadvantage in that people need to find and read the instructions from the wall, and the system can issue only one type of ticket: standard one way ticket.

It is also known from WO 2009/022356 that SMS based forms can be used by key value pairs. This document is cited here as reference. This text based method requires a lot of typing from the users within a form limited to 160 characters.

It is also known from publication WO 02/39765 of the inventor, how non-intrusive advertisements or messages could be shown to mobile phone users on the display, for example based on location as the user enters or leaves a cell of the cellular network. This document is cited here as reference. The disadvantage associated with this document is that the fact that the message does not intrude does not mean that the user needs or is interested in the message at all, and it is even less probable that the user is interested in the message at the moment and place of receiving the message.

It is also within the prior art to purchase goods by filling a form on the Internet while accessing it with a mobile phone, which allows for more complex transactions.

It is also known that search engines and any electronic information retrieval (IR) device operate by indexing. Indexing is the process by which a vocabulary of keywords is assigned to all documents of a corpus (=body of documents, such as the Internet or US congress library). Mathematically, an index is a relation mapping each document to the set of keywords that it is about:

$$\text{Index: } doc_i \xrightarrow{about} \{kw_j\}$$

The inverse mapping captures, for each keyword, the documents it describes:

$$\text{Index}^{-1}: \{kw_j\} \xrightarrow{describes} doc_i$$

The index relation is the fundamental connection between the user's expressions of information need and the documents that can satisfy them, this simply stated goal—"Build the Index relation"—is at the core of the IR problem and Finding Out About (FOA) generally, [Finding Out About, Richard Belew, cited and quoted here as reference].

These days search engines use web crawler software to pinpoint and pickup keywords from web pages and build the index relation. In doing so, web crawler indexing software will choose rare and relevant words to build the index relation. The fact that "and" is on a webpage is not really interesting because it does not limit the search, whereas "hypothermia" is a very rare word in the world wide web, and would probably be chosen as a keyword. Thus, a prior art search engine will search all keywords, but it will ignore words such as "and", "to" and many isolated alphanumeric characters such as "10" or "10-7 pm", because they are extremely frequent in the billions of web pages and essentially do not limit the search at all.

It is also known that Google mobile search and Google Maps for mobile deduces the location of the mobile phone from GPS data, WLAN-based/WIFI based services and Cell transmitter based services in this order of precedence (source: Google Maps—Wikipedia). The location is taken into account so that the user does not need to type his location in Google mobile search. Google Mobile also provides for automatic updating of the background location.

The problem faced by the prior art on the search side is that while location related human language identifiers are unique enough to be picked up as identifiers, such as the address "Fabianinkatu, Helsinki, Finland", many time-space related information, like the co-ordinates (longitude, latitude):

24.949586391448974, 60.16525494433567

Or "open weekdays 9 am-5 pm", are not indexed at all, or not quoted by web page owners on their sites.

Consequently when you try to search for a barber that would be open with available reservations as you are walking home from work, on the spot within your current postcode, right now, you end up having to search several web pages in advance that might be good candidates for providing the barber service, and manually inspecting whether they are actually open/closed/available/not available and so on. Walking on the street while staring at the mobile phone screen for search results could get the user driven over by a car, in addition to being distracting and unpleasant to consumers. Mobile Data Roaming is also very expensive in many countries.

Quite clearly what is needed is a dynamically and contextually aware automatic mechanism on the query side while having a dynamically and contextually aware search engine on the reply side to assist the user in passively browsing the information space as he changes location and time goes by, and providing the relevant results thereto, which can be then noticed and re-acted to with minimum effort. This should also be low cost, and not use cellular roaming connections if cheaper ones are available. The invention solves just this problem.

SUMMARY

The invention under study is directed towards a system and a method for effectively finding and accessing the electronic point of distribution of a good or service with a mobile station as the user intends to use, retrieve or purchase the service. For a walking consumer with a mobile phone, the consumer is browsing the web pages by his movement in space-time and his context, hence the title of the application.

A further object of the invention is to present a system and a method where some or all of the interactions at the electronic point of distribution are automated by the mobile station.

One aspect of the invention involves a mobile phone that is used by a user. The location of the user is discovered from a GPS receiver/transceiver in the mobile phone, or by the cell in the cellular network or by triangulation or other location determining methods. This location information is translated to at least one street address(es) for example by searching the information against a database of addresses in the mobile phone or over the network on a network server. The addresses are then used further as search terms to search over the Internet. Quite clearly, as the person walks for example on the street called "Fabianinkatu" in 00130 Helsinki, the web pages of companies at this address start popping out automatically as search results, as the mobile phone browses the Internet as the user moves on this street. Alternatively or in addition to posting information on the Internet, the companies can send information pages via Bluetooth and/or WLAN or other local short range information link in accordance with the invention.

If the user now types in "Hotel" into a search engine query field in his mobile phone, the mobile Internet and/or file system browser software and/or search engine software of the invention will realise that the user is searching for a hotel. Consequently, the search engine will rank and the browser will display for example the room reservation pages of hotels on Fabianinkatu ahead of other web pages. Further, if the Desktop/browser history of the user contains mainly confirmation emails with hotel rates of 100 Euros, the web pages of hotels with these rates are ranked ahead of others. Alternatively if there is a payday receipt showing mid-to-high income in the inbox or the file system, the search engine can use mathematical methods to deduce that e.g. 3-4 star hotels are the most relevant accommodation options for this user. After a search result is discovered that achieves or exceeds a certain relevance level, an alert is signalled from the mobile station, by sound, vibration, and/or light emission. This way the user will notice the hotel room opportunity as he is walking close by with the mobile station in his pocket.

When the user decides to access the reservation page and decides to book a hotel room, the browser/mobile phone software will automatically fill in the entries on the electronic reservation form, such as name, birth date, credit card number, customer loyalty card number and the like. The aforementioned data can be retrieved from the mobile phone memory, and only minimal information is required by the user to fill into entry fields with the keyboard. For example, in one embodiment only the security code of the card is requested to be entered manually. The user can now book the room in 20 seconds or so, a couple of blocks away from the hotel, without visiting the hotel, or without searching maps and hotels over the Internet. If the user has a business meeting or a conference at the postcode 00130, and needs a room for the night nearby, he can use the invention to avoid queues in receptions or the studying of maps and markets on traditional sites such as Hotels.com® or the like. To facilitate this service the mobile phone is typically connected to the Internet. However, it is possible in some embodiments that the hotels would send their electronic information via a Bluetooth or like local connection, and the inventive system would be arranged to search data available via said local connection in addition to or as replacement of the Internet.

After the booking has been made, the inventive mobile phone browser software prints the reservation confirmation or receipt for example as a PDF document to a file and/or on paper. This document could be automatically placed into a "receipts" folder, for later bookkeeping, or sent directly to an email address, IP-address, ftp address or other electronic address for bookkeeping. For example the PDF document of the hotel receipt could be sent to an invoice processing email of the company the user works for, and an enterprise resource management (ERM) software could automatically book the hotel fee as a business expense. From the PDF document the ERM software recognises for example the VAT (Value Added Tax) and total sum and other bill related financial parameters by searching and retrieving them to memory and/or scanning them for search and retrieval by e.g. "OCR" (Object Character Recognition), if the relevant items are not in text format, but rather in image format. Thus the user would not need to store a paper receipt to his pocket in accordance with the invention, and considerable administrative overhead is reduced.

So, for example in the case of a traveller without a hotel room in Helsinki, the user could set his mobile station to browse hotel room deals as he walks on the streets of Helsinki. The query parameters are automatically updated as the user moves in space-time and hence the search results are updated on the mobile phone screen as the user walks the streets and time goes by. In some embodiments the search results are not shown on the screen. It is useful to turn the screen off, and continue searching in accordance with the invention. In some embodiments, if there is a very good match to the search parameters a voice, sound, vibration and/or light signal is provided as an alarm to the user from the mobile station, signalling that he should look at the opportunity on the mobile station screen and/or the physical proximity more closely, and the screen is arranged to be lit up when this happens and/or in response to user action to said signal. This is typically conducted so that once a certain relevance level is exceeded by a search result the mobile phone software instructs the loudspeaker, vibrator and/or light to produce a certain signal. In one embodiment the mobile phone may ring and/or play a ringtone to signal a highly relevant search result. In one embodiment the mobile station vibrates the battery or screen and/or flashes a LED light and/or screen when a relevance level is exceeded. In some embodiments the user can set the threshold level of relevance for signal activation from his mobile station manually, but in other embodiments the search engine, mobile station, and/or a network server computer can set the threshold level of relevance or suggest suitable threshold levels to the user in accordance with the invention.

The invention makes possible a whole new phenomenon of human behaviour that has multiple advantages. The inventor has named the activity "walkbrowsing" or "browwalking". Of course the person is not walking on his eye brows, but rather he is passively or actively surfing the information space (e.g. Internet and local information networks) with his path in space-time as the dynamic search parameter. The user does not need to look at the screen of the mobile phone as he browses by walking. When something relevant is discovered by the search, he receives an alarm signal from the mobile station disclosing that an interesting search result is in the physical proximity.

Suppose a user is roaming the streets of London say on Piccadilly at 2 pm, with an airline e-ticket in the Inbox of the email software with flight details of the flight departing the same day 5 hours later at 7 pm on Sunday. Quite clearly, the inventive software will only be looking for activities that start and end in a time space of 2-3 hours in reasonable proximity to the area surrounding Piccadilly. The user types "museum" into the mobile station as input to a search engine. The search engine returns a webpage of the Royal Academy of Arts, which shows that there is an Exhibition titled "Glasgow Boys"; the museum is open, and just around the corner. This activity interests the user, he clicks on "tickets" on the webpage and the electronic purchase form is auto-filled by the mobile phone software of the invention. Consequently, the user clicks accept purchase, the mobile phone software retrieves the receipt electronically, and the user walks past the ticket queues into the exhibition, and shows the receipt if the ticket is controlled.

What happens in the network side of the inventive software system? Naturally the web pages need to be "crawled" by a search engine indexing software, commonly referred to as "web crawler". A web crawler typically analyzes a corpus of documents. For example the web crawlers of search engines like Google or Yahoo are "crawling" the entire public Internet and thereby arranging documents. For many of the known aspects of Information Retrieval, the reader is referred to the book "Finding Out About", by Richard K. Belew, which document is cited here as reference.

In one aspect of the invention, the prior art search engine is inventively improved to accommodate "browwalking". The inventive web crawler or information page crawler of the inventive search engine crawls for keywords in the usual way, but also for space-time access relevant information, such as location, opening hours at that location and/or price information at that location. The information extracted by and available in the inventive search engine is thus more multidimensional than in prior art search engines. In the extraction data OCR can be used to retrieve textual data in image format.

Now as the inventive mobile phone software receives a query: "museum" from the user, it can ask the search engine a coded query along the lines: "What museum associated activities are available for a mid-to-high income individual walking on Piccadilly in London UK on this Sunday afternoon now with a flight to catch in five hours?" Of course, this query is much more specific than the user typed query, and the matches to this query can be expected to be more relevant. In fact, many people would not realise to ask a search query from a search engine in this detail. By providing the relevant contextual parameters and translating them into query terms, the invention makes it easier for the user to know what to know & ask when he is on the move with his mobile station.

Even more importantly the inventive search engine provides search results based on consensual relevance at a certain location and/or time. The inventive search engine can store click through rates for websites as a function of the user's query location. If it turns out that, say more than 20%, of people searching and querying for a museum around Piccadilly London indeed click onto the Royal Academy of Arts, their webpage's relevance weight will be increased, as is very likely that the next person querying "museum" at Piccadilly is also trying to find the Royal Academy of Arts.

The invention thus has the revolutionary and pioneering advantage of allowing people to scan opportunities in the information space as they traverse through space-time in their own context. The invention facilitates on-demand effortless Mobile Internet Search that allows the users to browse passively or actively and access opportunities that they did not know about, or would not have had time to find out about with minimum effort as the software of the mobile phone is scanning the Internet and information pages for these opportunities and displaying the results dynamically on the mobile phone screen, or alerting about relevant results instead of displaying them all the time.

From the service provider perspective the invention provides equally revolutionary advantages. For example, if there is a cancellation at say a barber on the same day, the barber shop can possibly quickly acquire new customers by updating the reservation information and making it available over the Internet and/or a short range communication link, by allowing users that are passively looking for the service and happen to be in the neighbourhood to find the offered hair cutting service with their mobile stations. Quite clearly this is a far more effective way for businesses to find customers than emailing discount vouchers to half a million people at a time, and paying a lot of money for emails nobody reads and everybody hates, or purchasing conventional location based web links on Google. It is remarkably convenient to just take a haircut or purchase a burgundy silk tie on the way home spontaneously, but nobody is willing to pop into every barber to ask whether they are available, or go through tie racks of every shop, only to discover that burgundy ties have been sold out.

A mobile search method is in accordance with the invention and comprises at least one mobile station with a communication network connection, and the mobile station location is determined, and said mobile station connects and/or is connected to at least one communication network and is characterised by the steps of:

said location is searched against street addresses from at least one database and/or search engine on the mobile station and/or in the network, and at least one matching street address is computed and/or retrieved, said at least one street address is inputted as a query term into at least one search engine on the mobile station and/or in the network, said at least one search engine conducts at least one search in at least one said mobile station file system and/or the Internet and/or a file system in the network with said at least one query term, at least one search result is displayed to user on the screen of the mobile station.

A mobile station, arranged to determine its location, and arranged to connect to a communication network is in accordance with the invention and characterised in that,
- the said determined location is arranged to be searched against street addresses from at least one database and/or search engine on the mobile station and/or in the network, and at least one matching street address is arranged to be computed and/or retrieved,
- said at least one street address is arranged to be inputted as a query term into at least one search engine on the mobile station and/or in the network,
- said at least one search engine is arranged to conduct at least one search in at least one said mobile station file system and/or the Internet and/or a file system in the network with said at least one query term,
- at least one search result is arranged to be displayed to user on the screen of the mobile station.

A network server arranged to receive location data from at least one mobile station and/or determine location of said mobile station is in accordance with the invention and characterised in that,
- said location data is searched against street addresses from at least one database and/or search engine on the mobile station and/or in the network, and at least one matching street address is arranged to be computed and/or retrieved,
- said at least one street address is arranged to be inputted as a query term into at least one search engine on the mobile station and/or in the network,
- said at least one search engine is arranged to conduct at least one search in at least one said mobile station file system and/or the Internet and/or a file system in the network with said at least one query term,
- at least one search result is arranged to be displayed to the user on the screen of the mobile station.

A software program product arranged to determine the location of at least one mobile station is in accordance with the invention and characterised in that,
- said location is arranged to be searched against street addresses from at least one database and/or search engine, and at least one matching street address is computed and/or retrieved,
- said at least one street address is inputted as a query term into at least one search engine,
- said at least one search engine is arranged to conduct at least one search in at least one said mobile station file system and/or the Internet and/or a file system over a network with said at least one query term,
- at least one search result is arranged to be displayed to user on a screen of a mobile station.

In the above inventions of four preceding paragraphs the click-through rate from the user location is stored for at least one search result. This can be used in the ranking of the search results in the future. It is in accordance with the invention to rank web sites with high click-through rates from a specific location as relevant at that location. Similarly click through rates may be stored as a function of time of the query in accordance with the invention. Similarly click through rates may be stored as a function of time of the query and location in accordance with the invention. These inventions greatly improve the accuracy of location based search. As the relevance scale become more meaningful by the consensual relevance weights deduced from click through rates, the inventive mobile station alert signals when a relevance level has been achieved or exceeded for a search result become more and more useful in everyday life.

A search engine with an index relation is in accordance with the invention and is characterised in that, the index is time and/or location sensitive to at least one incoming query.

A search engine with an index relation is in accordance with the invention and characterised in that the index is arranged to calculate a numerical weight to the association between at least one time and/or user location of an incoming query and at least one document.

An electronic transaction method is in accordance with the invention and characterised in that,
- at least one computer sends a short range information page signal,
- at least one mobile station in range receives said signal,
- at least one said mobile station software and/or said computer software searches said information pages with at least one query term,
- at least one search result is shown on the display of the mobile station.

A mobile station in accordance with the invention is characterised in that,
- at least one computer is arranged to send a short range information page signal to said mobile station,
- the said mobile station in range is arranged to receive said information page signal,
- at least one mobile station software and/or said computer software is arranged to search said information pages with at least one query term,
- at least one search result is arranged to be shown on the display of the mobile station.

A network server in accordance with the invention is characterised in that,
- the network server is arranged to send a short range information page signal to said mobile station,
- the said mobile station in range is arranged to receive said information page signal and form a duplex connection,
- at least one mobile station software and/or network server is arranged to search said information pages with at least one query term,
- at least one search result is arranged to be shown on the display of the mobile station.

A "duplex" connection means that information can flow in both directions, e.g. from mobile station to server and vice versa. Albeit some security restrictions could be implemented to control the flow of sensitive information via the short range connections in accordance with the invention.

A software program product in accordance with the invention is characterised in that,
- at least one information page signal is arranged to be sent by a computer and a short range communication link,
- at least one mobile station in said range is arranged to receive said signal,
- said software program product searches said information pages with at least one query term received from said mobile station,
- at least one search result is arranged to be shown on the display of the mobile station.

In addition and with reference to the aforementioned advantage accruing embodiments, the best mode of the invention is considered to be client software on a mobile phone or other mobile station that can connect to a search engine over a network and dynamically search the Internet with user specified query terms and the space-time position of the mobile phone and signal an alert when the user is physically/geographically close to a relevant search result. Further in the best mode the mobile client software can search information pages displayed via a short range connection, such as WLAN or Bluetooth independently. Even further in the best mode search results with high location specific click-through rates are given high relevance weights for queries that take place in the location with the high click-through rate. The best mode of the invention is therefore a mobile search client and a search engine that matches, alerts and shows on the mobile phone screen the users to the closest documents in consensual relevance and space-time when relevance to the query exceeds a threshold limit, for both documents that are on the Internet and documents that are being sent by local computers via short range communication links to the mobile station for review.

BRIEF DESCRIPTION OF THE DRAWINGS

In the following the invention will be described in greater detail with reference to exemplary embodiments in accordance with the accompanying drawings, in which FIG. 1 demonstrates an exemplary embodiment of the inventive browsing method 10 as a flow diagram.

Some of the embodiments are described in the dependent claims.

DETAILED DESCRIPTION OF EMBODIMENTS

Figure 1:
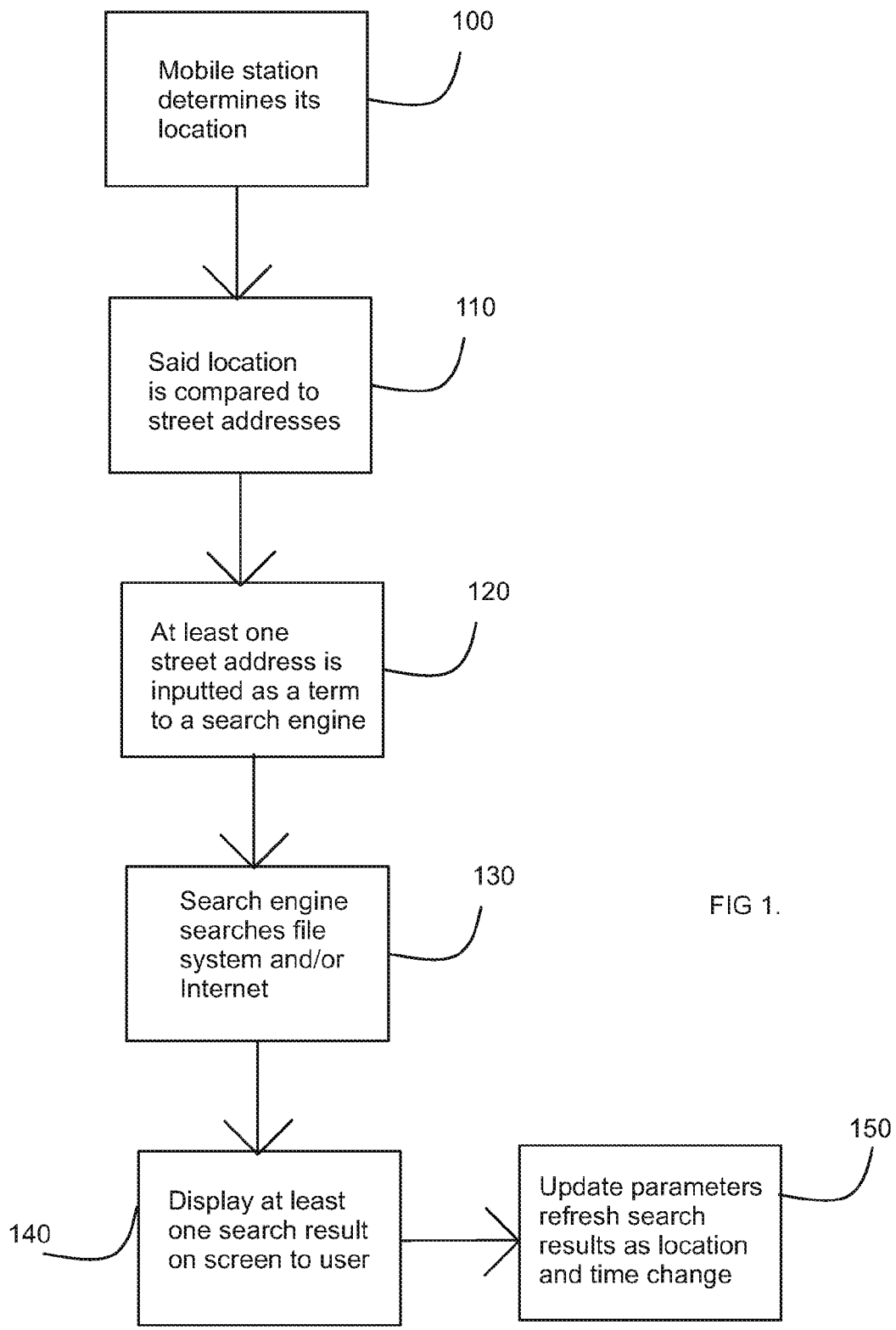

FIG. 1 demonstrates an embodiment of the inventive browsing method 10. In phase 100 the mobile station determines its location, or its location is determined by the network or third party. In the first case, the mobile station has a GPS receiver and/or transceiver that can determine its location. In the other alternative, if the mobile station is a cellular phone the location is determined from the cell identity the mobile phone is currently in, or by triangulation between base stations. In some embodiments sufficient location information is available in a network register, such as a Home Location Register (HLR), and the location of the mobile station can be read directly by a computer or the mobile station from there. Other techniques for determining the location could also be used in some embodiments of the invention, or the aforementioned methods could be used together in combination in accordance with the invention.

In phase 110 the said location information is compared to street addresses or other natural language location identifiers, like names of train stations or airports, e.g. Heathrow Airport, gives a location in a natural language (west of London, UK) even though it may not be a street. The location information is typically converted to natural language addresses by searching using the location co-ordinates as a query for matching natural language addresses in a database or group of databases and/or over a network of computers and/or with a search engine. The database or group of databases and/or network of computers can be for example any server with Geographical Information Systems (GIS) software installed on it in some embodiments. For example The U.S. Board of Geographic Names (BGS) and the earlier Federal Information Processing Standards (FIPS) provide place information in the US, and could provide such data, as well as other commercial and/or public place information providers in the US, EU and elsewhere. Typically there may be more than one matching street address in some embodiments.

In phase 120 at least one street address or natural language location identifier is inputted as a search term into a search engine on the mobile station and/or on a network computer. In some embodiments the coordinate→natural language address conversion is done at the search engine. In this embodiment the mobile station software client could only be feeding longitude and latitude coordinates into the search engine in accordance with the invention. In some embodiments the location of the mobile station is deduced by the search engine solely from network parameters without involving the mobile station. Preferably all the phases 100-110-120 are implemented automatically and as fast as possible without user input, but in some embodiments the user can add and/or delete one or more search terms or modify existing ones in phase 120, and/or the current time could be added as a search term. In some embodiments additional search terms are derived from the metadata and/or contextual information on the mobile station. For example keyword frequency in email inbox and/or desktop files could be used to define contextual search terms and/or ranking terms in some embodiments.

In the case of more than one street address, multiple parallel search queries for each street address and possible additional data as explained before can be formulated to a set of queries in accordance with the invention.

In phase 130 the said search engine searches with the search query the file system of the mobile station and/or at least one network computer and/or the Internet. In case of multiple queries the search engine executes the various query alternatives in series and/or parallel. In the case of multiple queries and results for each, in some embodiments the search results are aggregated to one result list in accordance with the invention. In some embodiments of the invention the search engine is just a conventional search engine Internet site or its application interface such as Google, Yahoo or the like. It is a known fact that the interior workings of these search engines are quite well kept trade secrets of their respective companies, and an independent developer cannot necessarily replicate Google based on instructions in the public domain. However, it is possible to use Google, Yahoo or other common search engines in accordance with the invention based on a "black box" approach. As the query sets or at least one query have been devised as described in the earlier phases, these queries can be automatically fed into Google or Yahoo with inputting software. This inputting software can for example emulate keyboard presses at the Google prompt when the Google input query line is active and feed the queries and collect search results into its memory for each or some of the executed queries. A computer script is then implemented to read the relevance scores, and when a certain threshold is exceeded a mobile client application is arranged to use the relevant mobile phone operating system/and/or manufacturer API (Application Programmer Interface) to initiate a sound, light and/or vibration signal with the mobile station.

Some search engines may cater for outside developers and it is in accordance with the invention to realise the mobile station software with a search engine application interface. For example Google Apps, the application interface of the search engine Google could be used to input the queries into the Google search engine automatically in some embodiments. The search engine on at least one network computer can be accessed in the network, over the network, across the network, or by any other conceivable access mechanism in accordance with the invention in some embodiments.

Alternatively, it is possible to build a dedicated search engine. It should comprise a web crawler such as any of the following: LibWWW Robot of the W3C Consortium, Perl based crawler interface by Gisle Aas, Parallel UserAgent by Marc Langheinrich, and/or the Visual Web Spider by Newprosoft.com. The web crawler is set to crawl web pages to compose the Index relation. The mobile station software is directed to send their search queries to a network computer with access to said Index relation, which is arranged to receive them. In a simple basic embodiment, it would be possible to require perfect matches to all keywords, and just rank these documents in the order of when these documents were last updated, i.e. to offer the latest complete hit or match to query parameters first. This type of an index is usually referred to as binary index. The queries produced by the inventive mobile station and/or search engine are typically more accurate and situation specific than the queries on average prior art engines. The relevant answers to the search queries are therefore much clearer, and especially when the inventive click-through rates at a certain location are stored by the mobile station and/or search engine to deduce consensual relevance weights, the most relevant search results will be clearer further still.

Of course the search engine could be independently implemented with more complex weighting and matching schemes. We are essentially measuring aboutness between the query and the documents, and a more sophisticated way of doing this is to use real value weights to describe the strength of the association between a document and a query, instead of the binary (0/1) (No/Yes) method. In some embodiments the real value weight $w_{kd}$ is proportional to number of occurrences of keyword k in document d noted here as $f_{kd}$. There are various alternatives to implementing the real value weights, but in one embodiment the inverse document frequency (IDF) approach is chosen with the Robertson & Sparck Jones weighting (Eq 3.22 Belew 2008):

$$w_{kd} = f_{kd} * (\log[(NDoc - D_k) + 0.5)/(D_k + 0.5)])$$

where, NDoc is the number of documents and $D_k$ the number of documents with the keyword k. Also the more complex OKAPI weights of equation 3.30 from Belew 2008 could be used in accordance with the invention in some embodiments.

Figure 9:
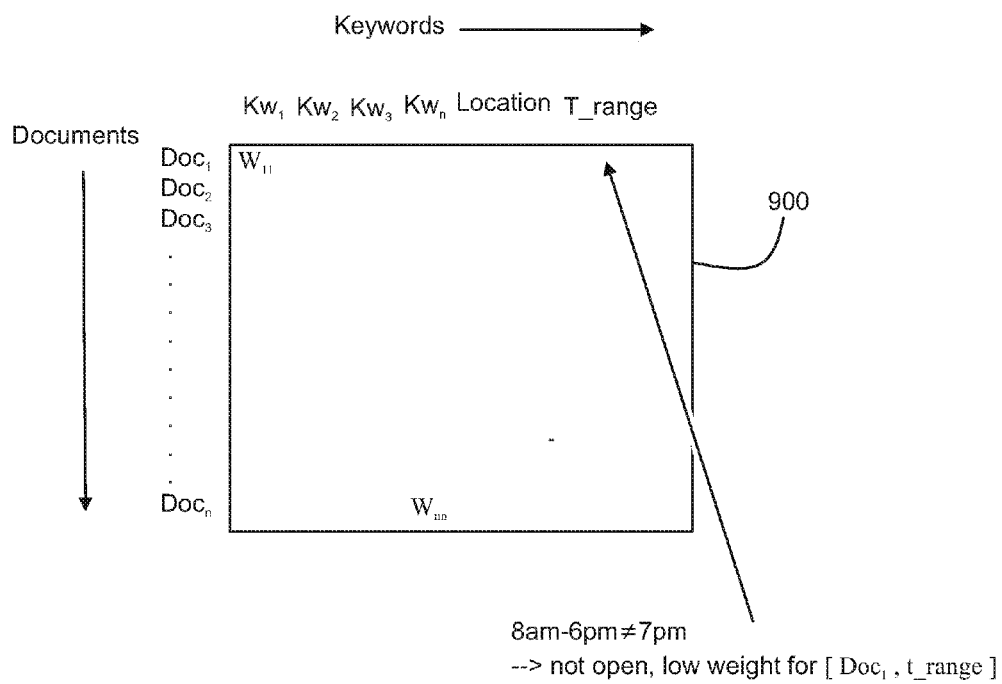
FIG. 9 shows an exemplary embodiment 90 of an index relation in accordance with the invention as a matrix.

These real value weights can be placed in the matrix from $w_{11}$ to $w_{nn}$, shown in FIG. 9 index matrix in some embodiments. We can take the inner product of the query and document vectors as our metric:

$$Sim(q,d) = q \cdot d$$

We define query q and all documents d to be vectors in a space of dimensionality equal to Nkw, the keyword vocabulary size. The documents that are the best match to the query are simply the ones that are most similar relative to metric Sim measuring distance between points in the space.

Further details to implement the basic information retrieval device for the search engine from first principles can be found from Chapters 3-5 of Finding Out About, Belew, 2008. The same reference also discloses additional mathematical techniques for the basic search engine such as Minkowski Metric (equation 5.9, could be used with the aforementioned vector space), singular value decomposition (SVD), the OKAPI retrieval system and the like, which could also be used as needed in accordance with the invention. Keyword discrimination and vector length normalization could also be used in accordance with the invention similarly as explained in Belew 2008.

In one embodiment the search engine over the Internet maintains and stores a record of which documents such as web pages are accessed from which geographic location the most and/or which web pages have been accessed from which geographic location with what query the most. Mobile users will probably not be searching for background literature for their PhD's with the walkbrowsing system of the invention. Instead, they want the very basic info and access ordering logistics when they are on the move: for example more than half of the users of the invention typing "train to London" at the Heathrow terminals could be expected to be searching for Heathrow Express, or Heathrow Connect, or Piccadilly line from the Tube. If this is evidenced by actual typed keywords and actual traffic to those web sites, the web pages of these train services can be arranged to receive very high consensual relevance weights for queries from that location in accordance with the invention in some embodiments. So if Heathrow express website has a high click-through rate (users proceed from the search result frequently to the actual web page), Heathrow express as a search result is likely to have a high relevance score in accordance with the invention. Because people are typically looking for very similar things in the same places the consensual relevance weights and the observation of click-through rates from a location is likely to increase search engine performance and reduce processing power and bandwidth requirements for search as the results are more relevant. The click-through rate is understood as the fraction of users at that location, when being shown the search result, click on the search result to view said search result or retrieve further information from the search result.

Click-through rates to deduce the consensual relevance of search results can be collected stored and used in at least three ways different ways:
1) consensual relevance weights as a function of location: click-through rates of search results with the user at a certain location,
2) consensual relevance weights as a function of location and time: click-through rates of search results with the user at a certain location within a certain time range,
3) consensual relevance weights as a function of location and time and user query: click-through rates of search results with the user at a certain location within a certain time range asking a certain query, e.g "train?".
    Quite clearly any permutation and/or combination of the above three alternatives is also in accordance with the invention.

In one embodiment of the invention the searching and contextual relevance ranking method outlined in EP09168388.8 and PCT/EP2010/061611 of the same patent family of the inventor could be used, which are incorporated into this application as one of the searching and ranking alternatives to be implemented on the search engine-server side. These documents are also included as references. In phase 140 the mobile station displays at least one search result on screen to user. Phase 140 is optional, and not all result to the updated searches need to be shown. When the user is "walkbrowsing" with the mobile station in the pocket, the display consumes power unnecessarily if it is on in the pocket when the user is not looking at it. Typically the most relevant documents are ranked first in some embodiments.

As the location changes by the mobile station moving, or time changes as it goes by, the aforementioned searches are conducted again with updated parameters and the search results on the screen of the mobile station are refreshed. The constant automatic updating of the parameters and refreshed search results allows the user to browse the Internet with his motion through space time as one search parameter, and discover new things about the current environmental surroundings with minimal administrative effort in phase 150. Time of the query can be automatically included as a query term in some embodiments. The time of the query can be the current time, the point in time when the query is sent or received, and/or a time mentioned in the query, like "Table for 7 pm?", being the query, 7 pm, is the time of query in some embodiments of the invention. Time of query can be used as a query term in alphanumeric format, numerical format or alphabetic format in accordance with the invention in some embodiments. Similarly location of the query can be the current location of user and/or mobile station and/or a location mentioned in the query. Thus, in the morning the user can just enter search terms into his mobile phone, put the phone in the pocket and wait for beeps or other signals identifying a match nearby. The search terms may involve commercial products, but also any other words, even people's names. In some embodiments the inventive mobile search client is configured to signal when the search retrieves e.g. a social network page of a friend that is geographically close. For example, user enters "Tom" as query term, Tom updates his status "I am on Fabianinkatu" to a social network page, the user gets to fabianinkatu or close by and "fabianinkatu" is used as a search term with "Tom". Consequently Tom's social network page is retrieved as a search result and the user is signaled and Tom and the user can meet spontaneously on fabianinkatu or nearby in accordance with the invention.

It should be noted that with the combination of user specified query terms and location terms several permutations of the invention are possible. In one embodiment the location terms are used to retrieve the documents and the user specified term is used to search and/or rank documents within this group of documents. In some embodiments the user specified query term is used to retrieve the documents and the location terms are used to search and/or rank documents within this group of documents. In some embodiments the combination of location terms and user specified terms is used as an integral query with multiple terms. The use of location terms to retrieve documents has the advantage that no user action is required. The use of user specified term first is more economical, as location terms are used to search from a considerably smaller collection of documents. This is likely to be an important consideration as data roaming charges are quite considerable and processing power is a scarce resource.

In order to save roaming data transfer resources and processing power, the system can be optimized. In one embodiment a first broader query is conducted for example as: pullover (user generated) London (computer generated). The inventive system then searches just the retrieved documents from this collection with more exact query terms as they are determined, e.g. W8, a London postcode.

The same network computer or network of computers can execute all or some of the phases 100, 110, 120, 130, 140 of the inventive method in some embodiments. In some embodiments different phases are executed by different network computers or networks of computers in accordance with the invention. Focusing many phases in the same network computer or network of computers allows for faster processing.

Quite clearly this continuous passive searching generates a lot of traffic in the cellular network and the Internet, but the frequency of the updating could be controlled by providing some control limits in accordance with the invention.

It should be noted that any features, phases or parts of the method 10 can be freely permuted and combined with embodiments 20, 30, 40, 50, 60, 70, 80, 90 and/or 91 in accordance with the invention.

Figure 2:
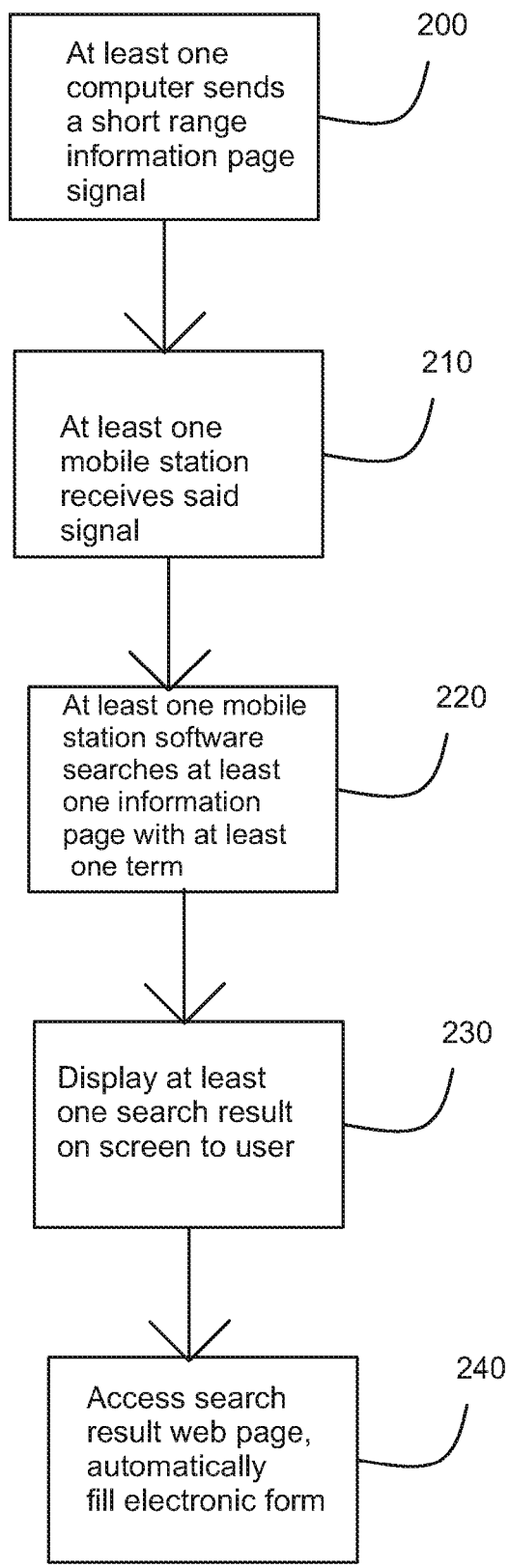
FIG. 2 demonstrates an exemplary embodiment 20 of the inventive browsing method implemented with short range communication links in accordance with the invention.

FIG. 2 demonstrates an embodiment 20 of the inventive browsing method implemented with short range communication links. In phase 200 at least one computer sends a short range information page signal. In some embodiments this signal is sent via Bluetooth or WLAN connection, which is local, i.e. range a maximum of a few hundred meters. The short range direct connection is a special case in the unified inventive concept, because the type of the connection itself reveals proximity without the need to use other location based parameters in the search terms. In phase 210 at least one mobile station receives the said information page signal. The information page signal is typically similar to any Internet page, but it is instead of the Internet sent directly via a short range data connection. In fact in some embodiments of the invention some parties may simply just keep broadcasting their web pages also via the short range connections, such as WLAN or Bluetooth. This requires minimal changes to existing systems. A WLAN base station that would have a transmit URL or -webpage would be sufficient in some embodiments. The owner of the WLAN link, say a cafe, would simply put the URL of its own web pages as the transmit URL. When a user enters a query term "espresso" into his mobile phone receiving the said signal, the mobile station software searches in phase 220 with the search term "espresso" the information pages of the aforementioned cafe, which are web pages in this case. Of course the mobile station software may search other incoming information pages, or may browse the Internet as outlined in embodiment 10 with the user specified term "espresso", and/or location data deduced in embodiment 10.

In phase 230 at least one search result is displayed to the user on the screen of the mobile phone. With a high likelihood the information page of the cafe with espresso on it, such as the "menu" page will rank quite high in the search results. In phase 240 the user accesses the said information page, where espressos can be ordered and in some embodiments also paid. In one embodiment the information page is an online order form, which is auto-filled by the mobile station software, for example providing any of the following: name, address, email address, phone number, username, password, credit card details, bank details, internet bank access codes, customer loyalty card data and/or the like. One or more entry fields may be auto-filled in accordance with the invention. By accepting and sending the online order the user can pay the product e.g. espresso electronically from 50 meters away and proceed to collect his coffee from the Barista by showing the receipt on the mobile phone screen. In some embodiments, the account details needed to process the electronic transaction are stored in the mobile station memory and/or a network computer memory, but on final approval the user is requested to enter a PIN number, similarly to purchasing with bank- and/or credit cards that have electronic chips. In some embodiments of the invention the banking details could be stored in the SIM card chip inside the mobile phone, similarly to the chip in the bank card. In other versions, such as the "software SIM", the banking details would be stored in the mobile station, network server or both.

In some embodiments any purchases are simply billed on the phone bill of the mobile station and/or network subscription being used. In this embodiment a useful optional alternative is to use the telephone number for user identification.

It should be noted that any features, phases or parts of the method 20 can be freely permuted and combined with embodiments 10, 30, 40, 50, 60, 70, 80, 90 and/or 91 in accordance with the invention.

Figure 3:
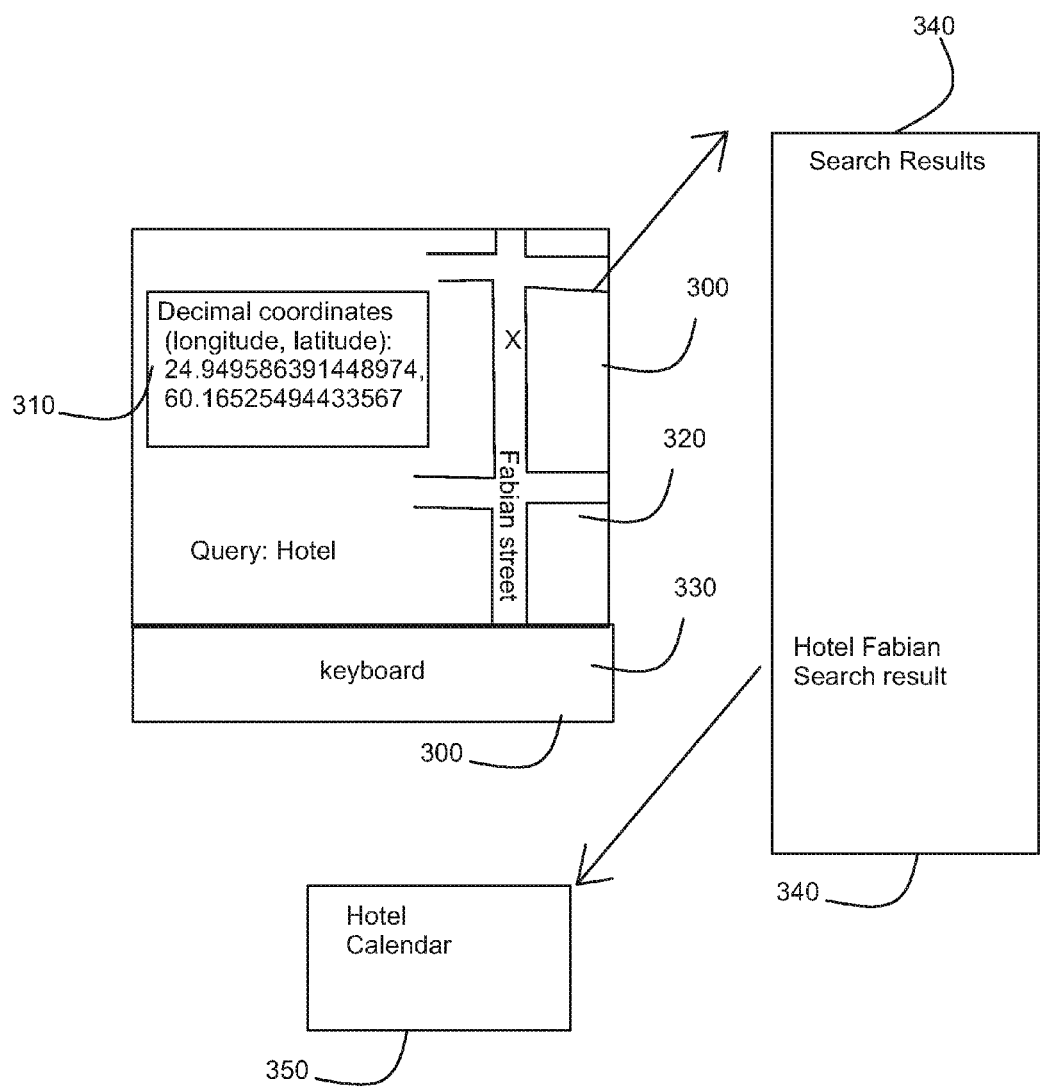
FIG. 3 demonstrates an exemplary embodiment 30 of the inventive mobile station when the invention is in use.

FIG. 3 demonstrates an embodiment 30 of the inventive mobile station when the invention is in use. The user is on Fabianinkatu in Helsinki Finland at Decimal coordinates (longitude, latitude):

24.949586391448974,
60.16525494433567

In this embodiment these coordinates have been deduced by GPS, but as said triangulation, cell identity, and other cellular based location determination methods could be used as well, but they will probably return less decimal places, i.e. provide less accuracy. The length of an arc degree of north-south latitude difference $\Delta\phi$, is about 60 nautical miles, 111 kilometers or 69 statute miles at any latitude. So the $6^{th}$ decimal place corresponds to roughly one meter, and the GPS has roughly 10 cm intrinsic error, so;

24.9495864,
60.1652549 would be the position in relevant significant figures. This position translates to being on Fabianinkatu as shown in block 320 on the screen. When the natural language address parameters with this position are inputted into a search engine with the user specified query term "Hotel", search results listed in screen block 340 are shown on the mobile station screen. The full query in this case might be for example:

"Hotel" (user generated), fabianinkatu (computer generated), 00130 (computer generated), Helsinki (computer generated).

Parentheses signify the origin of the query parameter. This query can be synonym expanded into multiple queries in accordance with the invention. The Boolean operators and, or, not, either/or, or other logical operators, can also be changed between the query terms automatically and/or manually to modify the query and/or to expand the query to different alternatives in accordance with the invention such as:

"Hotel" (user generated) AND fabianinkatu (computer generated) AND 00130 (computer generated) OR Helsinki (computer generated),
and
"Hotel" (user generated) OR fabianinkatu (computer generated) AND 00130 (computer generated) OR Helsinki (computer generated).

In one embodiment the user could just select any webpage from the hit list 340 by the usual way, pointing and clicking with the mouse, finger or any other user interface command used by the mobile station. In a more developed embodiment the contents of the mobile station and/or past browsing behaviour could be used to define a context for the user. For example if the user's inbox has confirmation emails and messages with hotel reservations costing about 100-150 Euros/night, and/or there is no reservation for tonight anywhere in the file system or email software of the mobile station, the mobile browser software will in some embodiments automatically navigate to the reservation page of Fabian Hotel on Fabianinkatu, and show the reservation page where an available room for tonight can be booked within the price range. If the user accepts this choice by pressing an icon or the like, the auto-filled payment and/or reservation form appears and the user can book the room by for example any of the following alternatives: clicking on an icon with a pointer, pressing a button, entering a number, such as a PIN number or CVC security code number on the back of a credit and/or debit card. The preferred webpage could also be ranked first in the hit list 340 in some embodiments. With the invention a suitable hotel room is found and booked within 20 seconds and ideally with only a couple of key presses in response to the confirmations asked by the software of the mobile station, which is typically the mobile Internet Browser.

In some embodiments of the invention the screen view 310 with the decimal co-ordinates is hidden from the user, and in some embodiments also the map 320 is not displayed. In some embodiments the user can access these via a menu. In a preferred embodiment the screen blocks 340 and 350 alternate on the screen or are both shown on the screen of the mobile station 300. As the user and the mobile station move and time goes by the search query is updated, the search is repeated with updated parameters and the hit list 340 is updated, the ranking is updated and/or a new first choice is updated. These updated screen blocks 340, 350 are then shown on the mobile station screen. In some embodiments five best matches or any number of best matches is displayed on the mobile station screen at some intervals so the user can passively view the searched choices available to him. In some embodiments the results are not shown on the screen, for example to save power by keeping the screen off. New updates to the search parameters and new searches based on said parameters and alerts based on search results that achieve relevance levels above a certain threshold can still be executed when these activities or some of them are not displayed on the screen of the mobile station in accordance with the invention.

In fact a multitude of display schemes can be implemented in accordance with the invention to suit individual tastes and mobile station designs. The main thing about the invention is that the user can arrange the mobile station to actively browse opportunities relevant to his space-time position, space-time trajectory, parameters and/or context; so that he can passively view and/or record the opportunities available in the information space and react to those that he chooses to react to with minimal administrative effort. If the user turned on the inventive walkbrowsing option in the morning with recording of top search results to a data file, he may view his journey in information space e.g. by watching the recording in fast forward afterwards in the evening. This is quite an entertaining and informative feature e.g. in a foreign city.

It should be noted that multiple passive search queries could be on at the same time in parallel. A person needing a haircut, and wanting to buy a purple pullover, could enter both the haircut and the purple pullover as separate queries into his mobile station, which will then dynamically search for both items as the user moves with his mobile station around the city and as time goes by.

It should be noted that any features, phases or parts of the mobile station 30 and associated systems can be freely permuted and combined with embodiments 10, 20, 40, 50, 60, 70, 80, 90 and/or 91 in accordance with the invention.

Figure 4:
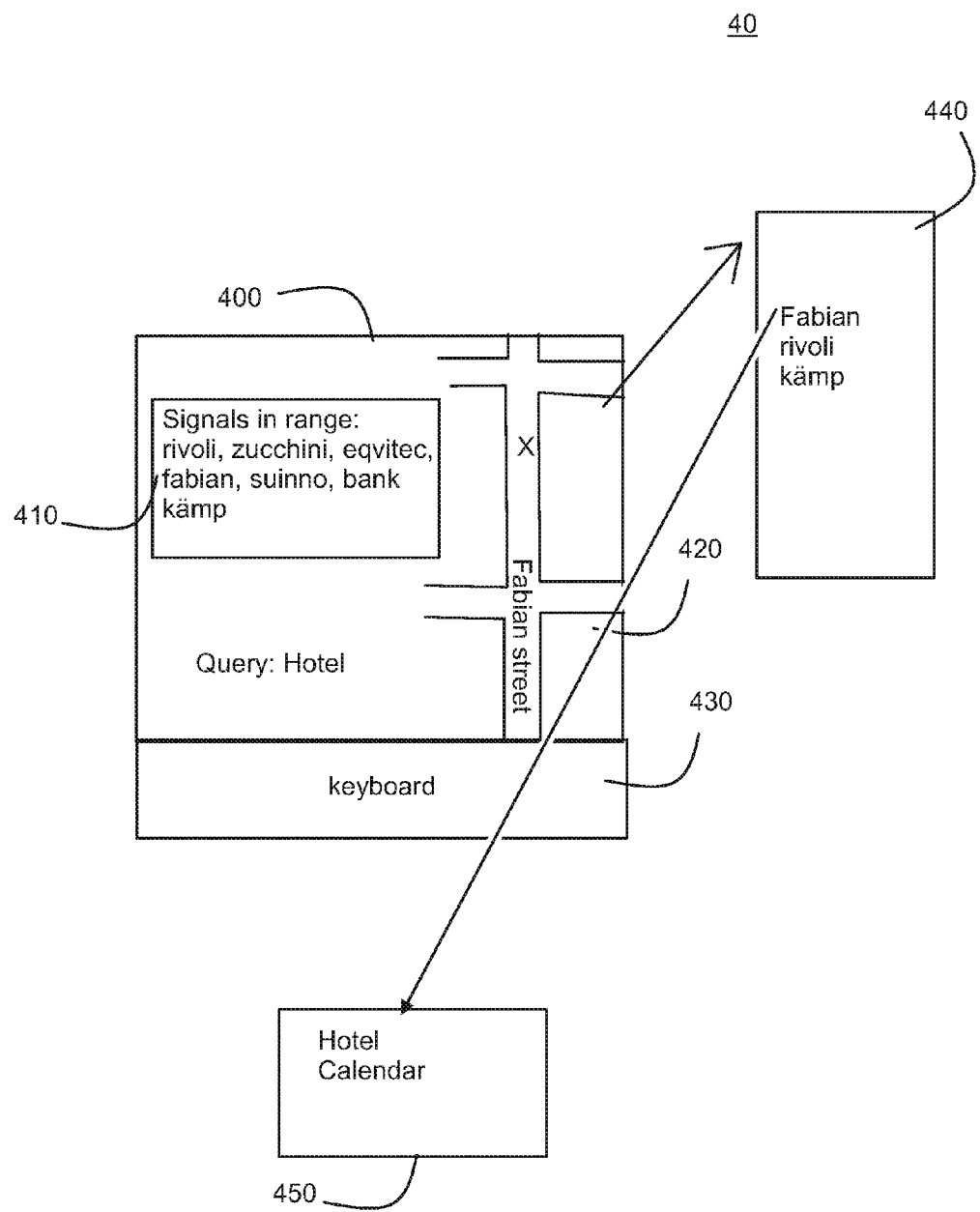
FIG. 4 demonstrates an exemplary embodiment 40 of the inventive mobile station when at least one short range communication link of the invention is in use.

FIG. 4 demonstrates an embodiment 40 of the inventive mobile station when at least one short range communication link of the invention is in use. In this embodiment the mobile station 400 is accepting incoming Bluetooth- and/or WLAN-signals, or other short range signals on various frequencies. The user is still on Fabianinkatu. The signals that are in range are Rivoli, Zucchini, Eqvitec, Fabian, Suinno, Bank and Kamp. These are all businesses and/or organisations that are within a couple of blocks from the position of the user, and so can reach the mobile station of the user with their signals.

The user has "Hotel" inputted as a query term. The mobile station software searches the information pages in the incoming signals, and quite quickly deduces that only Fabian, Rivoli and Kamp are hotels. The mobile station software lists these on the hit list 440, with the hotel "Fabian" that had the best match to context parameters ranked first, as explained with embodiment 30.

The mobile phone software then accesses the information pages via the short range communication link, and pulls up the reservation page of the hotel Fabian and displays it on the mobile phone screen. Naturally these web pages need to be accessible through the short range link as information pages. In this embodiment the mobile station typically needs to download information pages via the short range information links to memory or cache memory, search these information pages and rank the best matches onto the hit list 440 in accordance with the invention. In this embodiment at least one search engine of the mobile station would be used to conduct the searching.

In another embodiment, at least one query term is sent from the mobile station via the short range communication links, and the computers supporting the short range links only send those pages with matches to the mobile station for further ranking and listing on the hit list 440. In this embodiment the computer that is arranged to transmit at least one information page conducts the search with at least one search engine. In some embodiments at least one search engine is used both at the computer and the mobile station in accordance with the invention to conduct all or some of the composed search queries.

In some preferred embodiments the web pages of the organizations hosting and/or using the transmitters are simply broadcast via a short range communication link in addition to the Internet. In some preferred embodiments the mobile station reads and searches both the incoming information page signals and the Internet to deduce the hit lists 340 and 440. In this embodiment for example the hit lists 340 and 440 would be merged into one hit list, with hotel "Fabian" quite probably being ranked first. It should be noted that the use of the said short range communication connections such as WLAN and/or Bluetooth is many times free, where as access to the cellular networks incurs fees. Therefore in some embodiments the mobile station is arranged to prefer the cheaper option, which many times leads to the short range connection being preferred over the cellular connection, when information can be transferred via either channel to obtain the desired outcome. In some embodiments the short range connections are searched first, and the cellular network is used for queries only if no matches are found in the short range connections.

Quite clearly booking a hotel room is not a limiting example, but the invention can be used to transact any products commercially or non-commercially.

In some embodiments it is possible to record the hit lists 340, 440 as they change as a function of time, so that the user can later view what matches in the information space his journey has included.

The relevance alarm of the mobile station discussed earlier is also applicable with short range communication links and information pages transmitted with them. Provided at least one search result reaches a certain relevance level, the mobile station produces a sound, light and/or vibration signal.

The click-through rate of an information page at a certain location is collected by the information page transmitter computer system itself, and broadcasted to the mobile station in one embodiment. In an alternative embodiment the mobile station may look up the click-through rate from another computer in the network and/or the Internet.

It should be noted that any features, phases or parts of the mobile station 40 and associated systems can be freely permuted and combined with embodiments 10, 20, 30, 50, 60, 70, 80, 90 and/or 91 in accordance with the invention.

Figure 5:
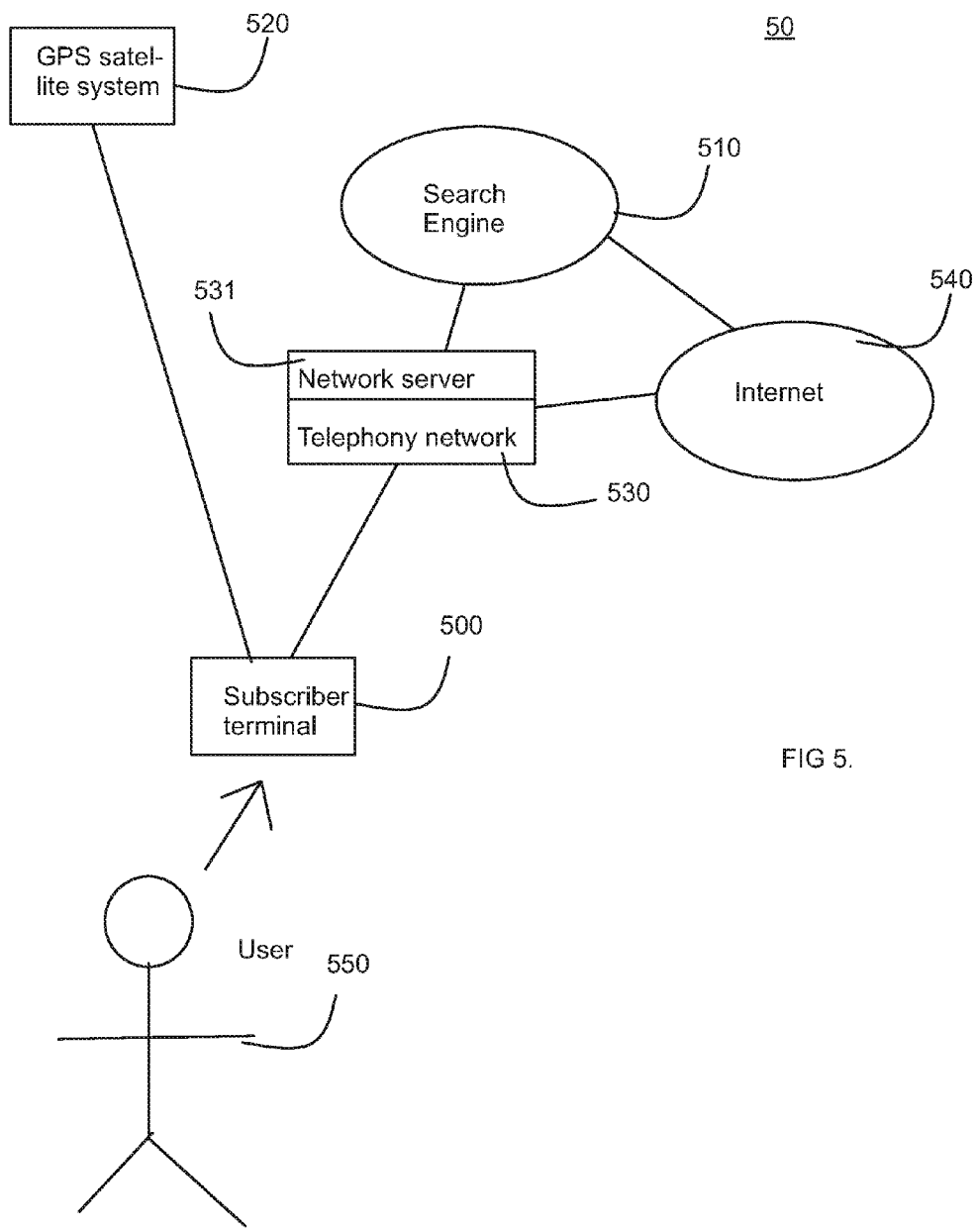
FIG. 5 demonstrates an exemplary embodiment 50 of the inventive communication system as a block diagram.

FIG. 5 demonstrates an embodiment 50 of the inventive communication system as a network diagram. The user is using the subscriber terminal 500, which is typically a mobile station, mobile phone or a computer, such as a PC-computer, Apple Macintosh-computer, PDA-device (Personal Digital Assistant), or UMTS- (Universal Mobile Telecommunication System), GSM- (Global System for Mobile Telecommunications), WAP- (Wireless Application Protocol), Teldesic-, Inmarsat-, Iridium-, GPRS- (General Packet Radio Service), CDMA- (Code Division Multiple Access), GPS- (Global Positioning System), 3G-, 4G-, Bluetooth-, WLAN- (Wireless Local Area Network), and/or WCDMA (Wideband Code Division Multiple Access)-mobile station. Typically in some embodiments the subscriber terminal is a device that has an operating system such as any of the following: Microsoft Windows, Windows NT, Windows CE, Windows Pocket PC, Windows Mobile, GEOS, Palm OS, Meego, Mac OS, Linux, BlackBerry OS, Google Android and/or Symbian or any other computer or smart phone operating system.

In some embodiments the subscriber terminal has a GPS transceiver and/or receiver, and it uses the GPS satellite system 520 to deduce its location. Other satellite systems for locating the subscriber terminal may be used as they become available in accordance with the invention. The GPS satellite system typically outputs the latitude and longitude co-ordinates, but in some embodiments it may also output the height of position above earth surface to reveal whether the subscriber terminal is in an aircraft, elevator, skyscraper or the like.

In some embodiments there is no separate satellite system available for locating the subscriber terminal. In some embodiments the telephony network 530 is a satellite telephony network that locates the subscriber terminal also. In some embodiments the telephony network is a cellular network, and the location of the subscriber terminal is deduced by triangulation, cell identity and location of the cell where the subscriber terminal is currently, or read from any network register such as HLR (Home Location Register) and/or VLR (Visitor Location Register).

The user 550 accesses the Internet 540 and a Search Engine 510 via the telephony network 530. In some embodiments the search engine is a conventional search engine such as Google®, Yahoo®, AltaVista®, Lycos®, Baidu® or the like. The telephony network is typically a cellular network such as UMTS- (Universal Mobile Telecommunication System), GSM- (Global System for Mobile Telecommunications), GPRS- (General Packet Radio Service), CDMA- (Code Division Multiple Access), 3G-, 4G- and/or WCDMA (Wideband Code Division Multiple Access)-network.

The location co-ordinates are typically converted to at least one natural language address at the subscriber terminal 500, and/or over a network computer that is accessed via the telephony network 530. In some embodiments the network server doing the co-ordinate→address transformation hosts or is connected to a search engine 510. In some embodiments the network server 531 is accessed via the Internet 540, in some embodiments it may be accessed via a closed network, such as for example a VPN Virtual Private Network or a telecommunications operator controlled and/or operated network.

In some embodiments the subscriber terminal 500 is arranged to output location coordinates to the search engine 510 directly, which is arranged to conduct the translation to natural language identifiers independently.

The at least one natural language address is then used to compose at least one search query. In some embodiments user specified query words are added to at least one query. In some embodiments parameters that are derived from the file system of the subscriber terminal 500 are added and/or used to modify at least one search query. The at least one search query is then sent to the Search Engine 510 over the telephony network 510 that searches the Internet 540 for relevant documents matching the said at least one search query.

In some embodiments the search engine deduces the location of the mobile station from information available in the network, such as WLAN/WIFI identities, or cellular base station identities or triangulation using base stations. In some of these embodiments only the user specified query term is required to be transmitted and/or delivered from the mobile station to the search engine.

In some embodiments there are multiple search queries and the search engine executes multiple searches based on said queries and composes an aggregate list of the matching documents.

The co-ordinate→natural language address transformation may result in multiple addresses and thus multiple search queries in accordance with the invention. Likewise any search query may also be synonym expanded in accordance with the invention, for example by splitting e.g. Hotel, Helsinki, fabianinkatu, to two queries, the original: Hotel, Helsinki, fabianinkatu and the synonym expanded: Hotel, Capital of Finland, fabianinkatu.

In one embodiment the user is browsing for opportunities within a range of, say 200 m, from his location. This of course leads to multiple addresses within that range and thus potentially multiple search queries in accordance with the invention. For example if fabianinkatu 13 in Helsinki is the mobile station's current location, addresses on unioninkatu and kasarminkatu will be within 200 m range. If the user types query word "hotel", the inventive mobile station will convert this to three queries: 1) Hotel, fabianinkatu, Helsinki 2) Hotel, unioninkatu, Helsinki 3) Hotel, kasarminkatu, Helsinki. These query strings may be searched in parallel or in series, and the aggregate search results from the three queries are consolidated into one list in some embodiments. In more elaborate embodiments the street number ranges, such as fabianinkatu 23-1 within the desired distances could also be incorporated into the queries, by having the number range, or one query each for each street number, as explained before and consolidating search results.

In some embodiments there is also a search engine in the subscriber terminal 500. This search engine can be used to search the file system and/or memory of the mobile station in some embodiments. In some embodiments a search engine and/or database in the subscriber terminal is used to conduct the co-ordinate natural language address transformation at the subscriber terminal in accordance with the invention.

It should be noted that any features, phases or parts of the system 50 can be freely permuted and combined with embodiments 10, 20, 30, 40, 60, 70, 80, 90 and/or 91 in accordance with the invention.

In some embodiment the mobile station only receives the at least one relevance score and/or metric from the search engine. It is also possible that the mobile station software is used locally to compute a relevance score, for example to use contextual local data parameters and/or save data traffic resources in accordance with the invention. In both of the aforementioned cases, and other alternative implementations the relevance can be used as a measure as to whether to initiate a sound, light and/or vibration alert with the mobile station.

Figure 6:
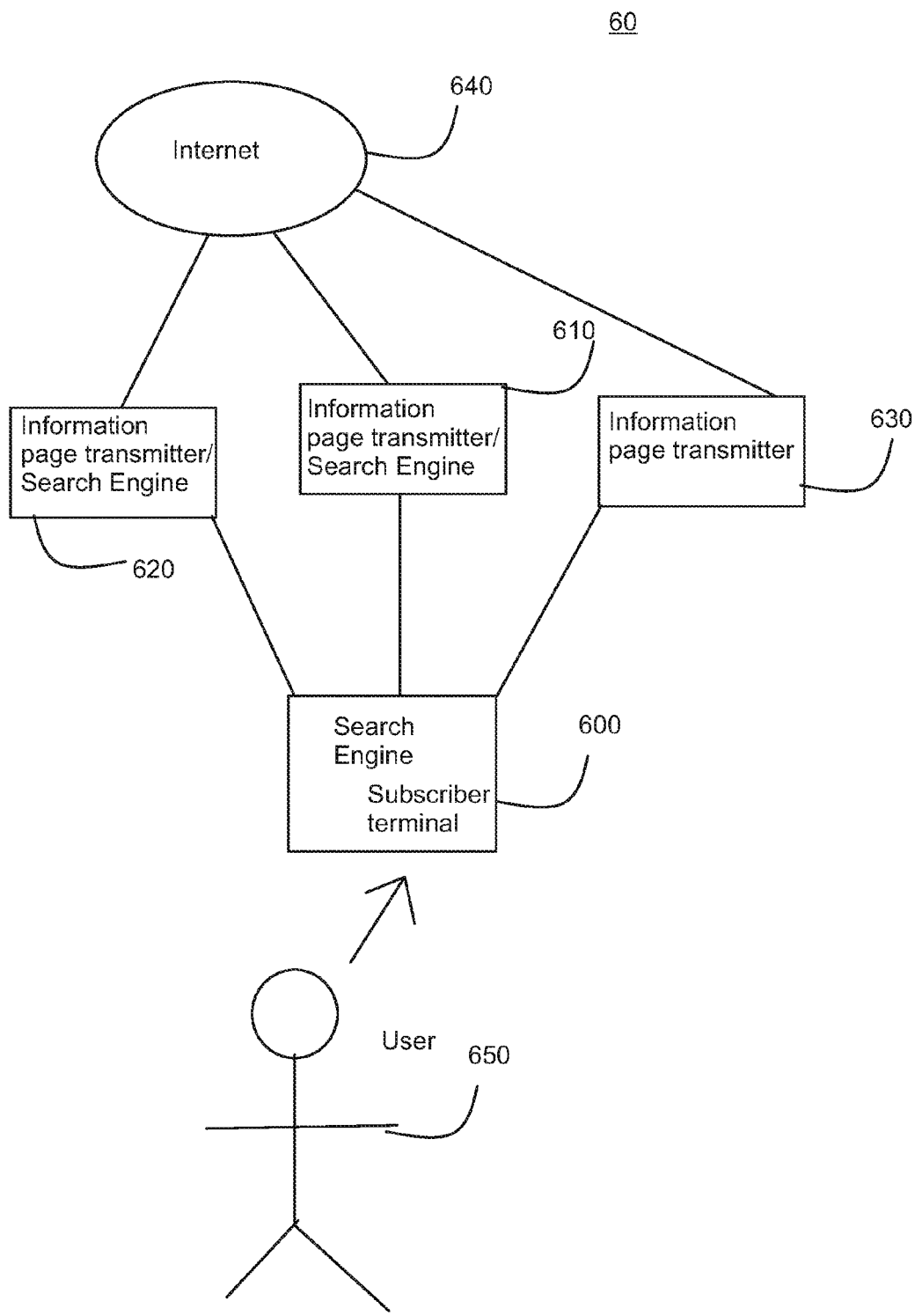
FIG. 6 demonstrates an exemplary embodiment 60 of the inventive communication system when at least one short range communication link of the invention is in use, and as a block diagram.

FIG. 6 demonstrates an embodiment 60 of the inventive communication system when at least one short range communication link of the invention is in use. Examples of short range communication links are Bluetooth, IrDA and/or WLAN, but other options might also be available for the inventive implementation.

As the user 650 moves with his subscriber terminal 600 that comprises at least one search engine the subscriber terminal receives short range communication signals from information page transmitter devices 610, 620, 630. These devices are typically computers equipped with or access to and/or connected to at least one short range communication link, such as Bluetooth, IrDA, NFC (Near Field Communication) and/or WLAN or the like. These computers and links typically transmit the pages that their operators, hosts, and/or controlling organisations want them to.

In some embodiments the information pages that are transmitted are simply the web pages of the sender. Information page transmitter may read the information pages to be sent from the same folders that host the web pages in some embodiments, or it may read the web pages to be broadcast from a different folder on a network computer or on a local computer.

The search engine in the subscriber terminal 600 will typically access the information pages via the short range communication link, and search the information pages with at least one search query. In other embodiments merely the query is sent to the information page transmitter computer, which receives the query, searches its pages and returns matching pages via the short range communication link. The advantage that the latter embodiment has is that less material needs to be downloaded to the subscriber terminal 600.

It should be noted that the short range communication link is a special embodiment in that it is known that the transmitter is nearby from the communication type itself. There is therefore less of a need or no need to locate the subscriber terminal as location information is intrinsically known. In some embodiments the search query used to search the information pages omits location related data: it only contains user specified search terms and/or terms derived from the context and/or file system of the subscriber terminal.

In a preferred embodiment the systems 50 and 60 work in parallel, i.e. information pages received via short range communication links and Internet pages are searched simultaneously with same or different search queries in accordance with the invention. As the subscriber terminal moves, time passes by, or the user changes his query, or the context data or metadata change by the deletion or addition of data in the mobile station, the search queries change, short range communication links fall out of range and come into range, and new matches are dynamically updated to the aggregate hit list of both hit lists 340, 440 on the subscriber terminal screen in accordance with the invention. Naturally both embodiments 50, 60 can be implemented in the same mobile station, to work separately or together, and in parallel or in series.

In a preferred embodiment of the invention the embodiments 50 and 60 are combined, and the relevance alarm (sound, light and/or vibration) is used for relevant search results obtained by searching information pages via short range communication links and/or the Internet. This embodiment may also optionally but preferably feature the storing of click-through rates for search results at a certain location, at a certain time range and/or associated with a certain user specified query to measure the consensual relevance of search results obtained from information pages via short range communication links and/or the Internet. The said click through rates are optionally but preferably used to rank the search results in relevance and/or allocate relevance scores to said search results.

It should be noted that any features, phases or parts of the system 60 can be freely permuted and combined with embodiments 10, 20, 30, 40, 50, 70, 80, 90 and/or 91 in accordance with the invention.

Figure 7:
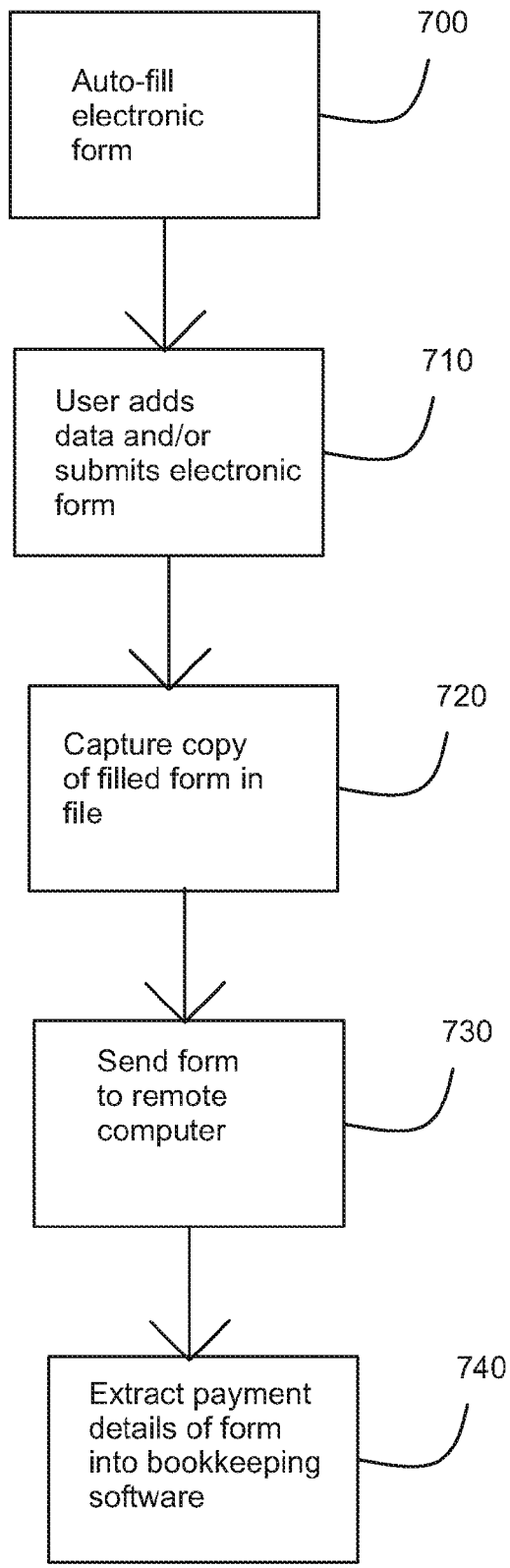
FIG. 7 demonstrates an exemplary embodiment 70 of the inventive processing method used with the electronic page selected with the inventive browsing method as a flow diagram.

FIG. 7 demonstrates an embodiment 70 of the inventive processing method used for example with the electronic page selected with the inventive browsing method. The invention can be used to just passively view pages of information. However, this embodiment relates to the situation where the user and the page provider have an interaction and exchange information, for example in a commercial transaction. In phase 700 an electronic form on the page is filled automatically by the mobile station and/or network server software. In one embodiment this happens so that the entry fields on the electronic page are identified and the text descriptor associated with them. For example if the electronic page has an entry that is titled "First Name" the First Name is searched and possibly also synonym expanded against data in the subscriber terminal. As the subscriber terminal is registered, to say the inventor, from the registration data, it can be searched that the "First Name" matches with "Mikko". Consequently, the mobile station and/or network server software enters "Mikko" into this entry field. The same process is repeated to all other entry fields from the same or different data source, such as last name, address, telephone number, credit card number, customer loyalty card number and so on.

In some embodiments the data is already at the server, for example because the user has filled the form before, and has been issued a username and/or a password. In these embodiments the subscriber terminal software can auto-register by automatically filling username and/or password and logging in. In some embodiments the subscriber terminal may log the user onto the server and provide identification information by submitting phone number, credit card number, bank account number and/or passport ID, all of which are typically unique and can be used to deduce other personal details of the user.

In phase 710 the user adds data in some embodiments. For example in one embodiment, at least one entry field is always left unfilled. This is to ensure that the user correctly fills at least one entry field in person, so that unknown people do not submit fraudulent information with the auto-fill feature or that the mobile station does not accidentally submit automatically filled forms without the user becoming aware of the process. For example, in one embodiment, especially when the electronic form involves a commercial transaction and a payment, the user is asked to enter as PIN number, the PIN number of his payment card and/or the security code on his and/or behind his payment card and/or the PIN in the mobile station and/or SIM card.

In phase 720 after the form has been submitted a copy of the filled form is captured in a file, for example a PDF file in some embodiments. Any other file format is also in accordance with the invention such as an image file format such as JPG, PNG, or other document formats such as Postscript and the like in accordance with the invention.

In phase 730 the file that contains the form is sent to a remote computer. This remote computer is a computer server that in some embodiments belongs to the employer of the user. In phase 740 relevant data is searched from the form and stored by archiving software in some embodiments. The form and the file can also be stored as a backup in accordance with the invention in some embodiments. In some embodiments the extracted data is stored and processed in a book keeping and/or financial software such as NetVisor® or the like.

It should be noted that any features, phases or parts of the method 70 can be freely permuted and combined with embodiments 10, 20, 30, 40, 50, 60, 80, 90 and/or 91 in accordance with the invention.

Figure 8:
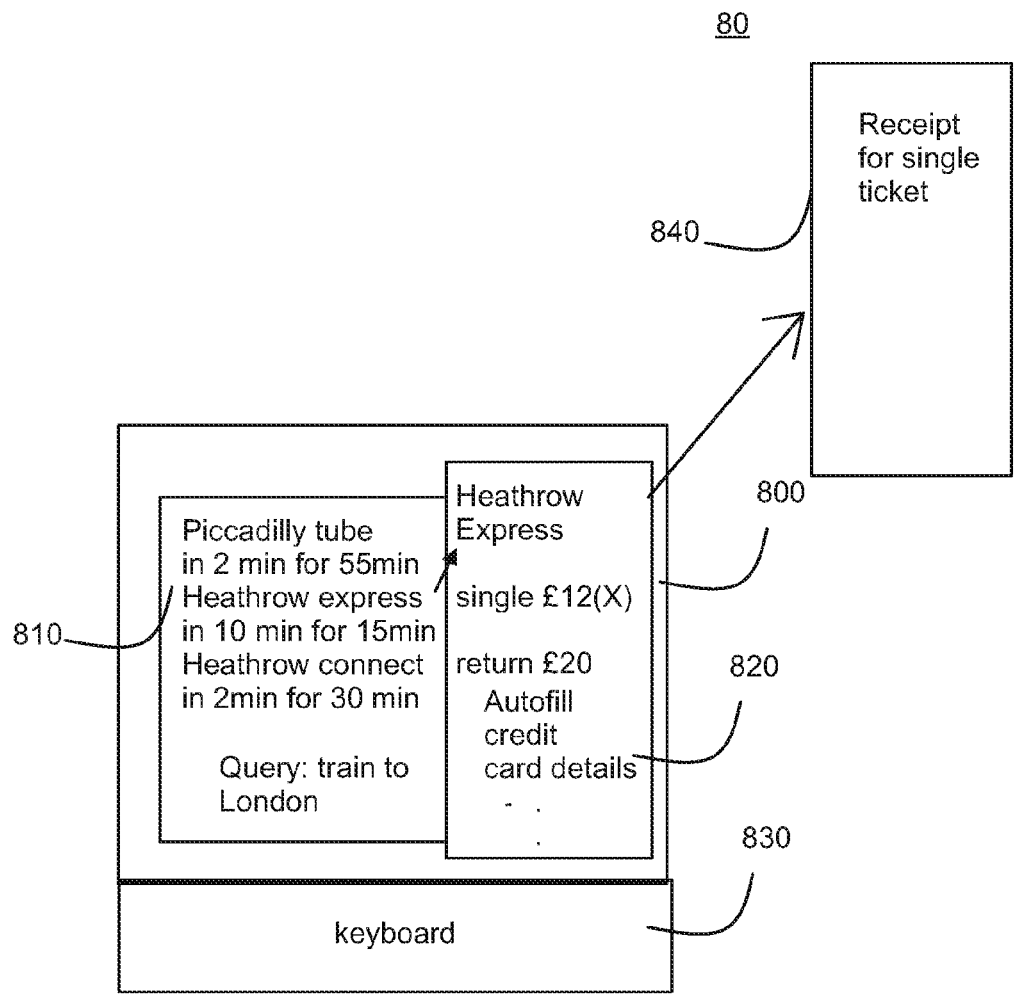
FIG. 8 demonstrates an exemplary embodiment 80 of the inventive processing method used with the electronic page selected with the inventive browsing method as a block and flow diagram from the perspective of the user.

FIG. 8 demonstrates an embodiment 80 of the inventive processing method used with an electronic page, for example selected with the inventive browsing method.

Say the invention is used at Heathrow airport as described with the earlier embodiments by a person stepping out of immigration, and deciding to proceed to central London after the flight. He types "train to London" to his mobile station, and the Internet and/or incoming short range communication signals are searched. The searches reveal options listed in the hit list 810 on the screen.

Now as the search results show all available train routes and their timetables, the user can choose the preferred route and transport option whilst he is approaching the different train stations.

The user chooses Heathrow Express, and the reservation page of Heathrow Express is accessed, and the reservation form is partly or entirely auto-filled by the mobile station software. In some embodiments the user can fill the reservation form also himself. In the example of FIG. 8 the single ticket to Central London (Paddington) is selected, and the receipt for that ticket and possibly a separate ticket itself is sent by return via the Internet and/or via the short range communication connection in accordance with the invention.

In some embodiments the form is filled via e.g. Bluetooth and/or WLAN, and the payment of the ticket is conducted via an NFC (near field communication) link.

It should be noted that any features, phases or parts of the method 80 can be freely permuted and combined with embodiments 10, 20, 30, 40, 50, 60, 70, 90 and/or 91 in accordance with the invention.

It should be noted that generally for search to be effective, there are two overriding criteria: The searcher needs to search diligently, and the thing being searched would need to be available for finding.

Consequently, the invention will work a lot better with companies and organizations that design their web pages better, to reflect a "let's do business in the next 2 minutes on the spot" scenario. If we observe Heathrow Express webpage at the time of the invention, the inventive search method would need to parse and combine several web pages to get to the flexibility and availability of information shown in FIG. 9. The time tables are on different pages to the booking prompt or do not exist, and there is no news on when the next train is about to depart, except that it will be in 15 minutes. Instead the webpage is littered with infomercials: John Lewis department stores is teaching people how to pack, and providing vouchers. However the inventive storing of click-through rates at a location, and their use in composing relevance scores greatly relieves this need to design better web pages. Irrespective of badly formulated queries and poor web page design for search engines, if there is a strong consensual relevance evidence by high click through rates at that location, the search engine can dig a badly written webpage even with mistyped query: At heathrow, when using the invention and typing "tran" the Heathrow express webpages come up first, because a high percentage of mistyping people at hurry at Heathrow click through to the Heathrow Express web pages with this query, even though the web pages themselves do not feature any tags to attract mistyped queries such as "trin" "tran" "tain" or the like.

The reservation system would of course benefit from a greater time resolution than 15 minutes, but this would require the web page operator to publish the prospected departure times from Heathrow or London in real time on a web page, as the trains move in real time so that the web crawler software can find the information. Obviously, the web crawler cannot find information that simply is not there. For time sensitive information the web pages contain a tag and/or generate metadata that alerts the web crawler to revisit the page frequently enough to maintain sufficient time resolution in some embodiments of the invention. In some embodiments of the invention the search engine providers could even charge a fee for these tags and/or metadata. However, a more practical solution is to use the click-through rates and the consensual relevance ranking of the invention as discussed earlier.

Adding time and space criteria proposes new challenges and improvements for the search engine itself. Address related information is expressed as keywords, so in some embodiments the addresses are handled as normally by searching matches with keywords using synonym expansions, other query term expansions, and other prior art techniques, many of which are discussed in references in detail.

However, current search engine technology has a bit of a difficulty with opening times, departure times, i.e. searches where relevance is dynamically changing. For example, the reader recalls the user from the Summary-section of this application, walking on Piccadilly with the "walkbrow" invention of this application on in his mobile station.→The Royal Academy of Arts would not be a very relevant match on the hit list, if it would not be open to the public at the time of the walk.

FIG. 9 shows an embodiment of index 90 in accordance with the invention which may be used for example by a search engine of the invention. The index is represented by a matrix where documents ($doc_x$) are related to their keywords ($kw_x$). In a prior art matrix the vector space is typically binary, i.e. the entries are either 0 or 1, depending on whether the keyword occurs in the document and/or is associated with the document or not, or real value weighted as discussed with FIG. 1. Needless to say, a present day index can be humongous, for example the index used by Google, Yahoo, or other large search engines quite probably has one or more indices comprising millions of entries.

The index of the invention is time and/or space sensitive. This can be implemented in a multitude of ways in accordance with the invention. We will consider the temporal case first. Assume $Doc_1$ relates to web pages of a café that is open from 8am-6 pm. The index 90 contains a vector t_range in one embodiment that specifies whether the café is open at the time of the query. In a practical use scenario user uses the inventive mobile station to launch the query "café" in the postcode area of the café at 7 pm. The mobile station, network computer and/or search engine will calculate a real value weight or binary weight in [$Doc_1$, t_range] element which is arranged to increase or decrease the relevance of the $Doc_1$ documents to the query from said mobile station. Typically the fact that the facilities are open for business carries a heavy relevance weight, with closed facilities ranked irrelevant and thus low, and open facilities ranked high in some embodiments of the invention. In this case the café is closed so [$Doc_1$, t_range] should have a value that is low.

In some embodiments the [$Doc_n$, t_range] is just added to real value weights of $Doc_n$, and its value is chosen so that $Doc_n$ will rank high when the facility is open and relevant, moderately high when relevant and closed, and irrelevant and open, and irrelevant and closed follow in this order of relevance.

One option to acquire the values to the t_range vector is to use web crawlers to crawl the web pages for opening times and time ranges, especially when they occur together like "open mon-sat 7-4" from web pages, instead of not entering them into the index.

If the opening times are in image format, OCR can be used by the web crawler to scan the information and thereby retrieve it. The time of the query is typically the time at which the query occurs e.g. 5 pm, or if the query itself contains the time e.g. "table for 7 pm?", that is the time of the query. So if the query is "Table?" at 5 pm the mobile station will show restaurant vacancies close by that have a free table now, but if the query is table for 7 pm the mobile station display will show vacancies of restaurants close by at 7 pm, even if current time is at 5 pm in accordance with the invention in some embodiments. Similarly the location of query can be the current location and/or the location in the query in some embodiments of the invention.

Also indexes with a location vector and also location and temporal vectors are in accordance with the invention. Most location based identifiers have natural language descriptors that are intensively indexed already by the prior art web crawlers. It is the temporal data that is not indexed sufficiently for the "walkbrowsing" described in this application. This problem is also alleviated with the calculation, estimation and/or storage of click-through rates as a function of location of user's mobile station, current time and/or at least one current query term. The click-through rates are typically stored in a search engine server computer or a search engine server computer network, where the click-through rates can be used to compute relevance scores and rank search results.

Existing web crawlers such as LibWWW Robot of the W3C Consortium, or Perl based crawler interface by Gisle Aas or Parallel UserAgent by Marc Langheinrich, or the Visual Web Spider by Newprosoft.com could be inventively modified with the above improvement to supply the time sensitive data from web pages to the search engine of the invention. The additional inventive software in the Visual Web Spider, or any prior art web crawler crawls & scans for opening time related words and numbers. In some embodiments, these data are placed in the t_range column or the like in the inventive search engine and index relation.

It should be noted that any features, phases or parts of the embodiment 90 can be freely permuted and combined with embodiments 10, 20, 30, 40, 50, 60, 70, 80 and/or 91 in accordance with the invention.

Figure 10:
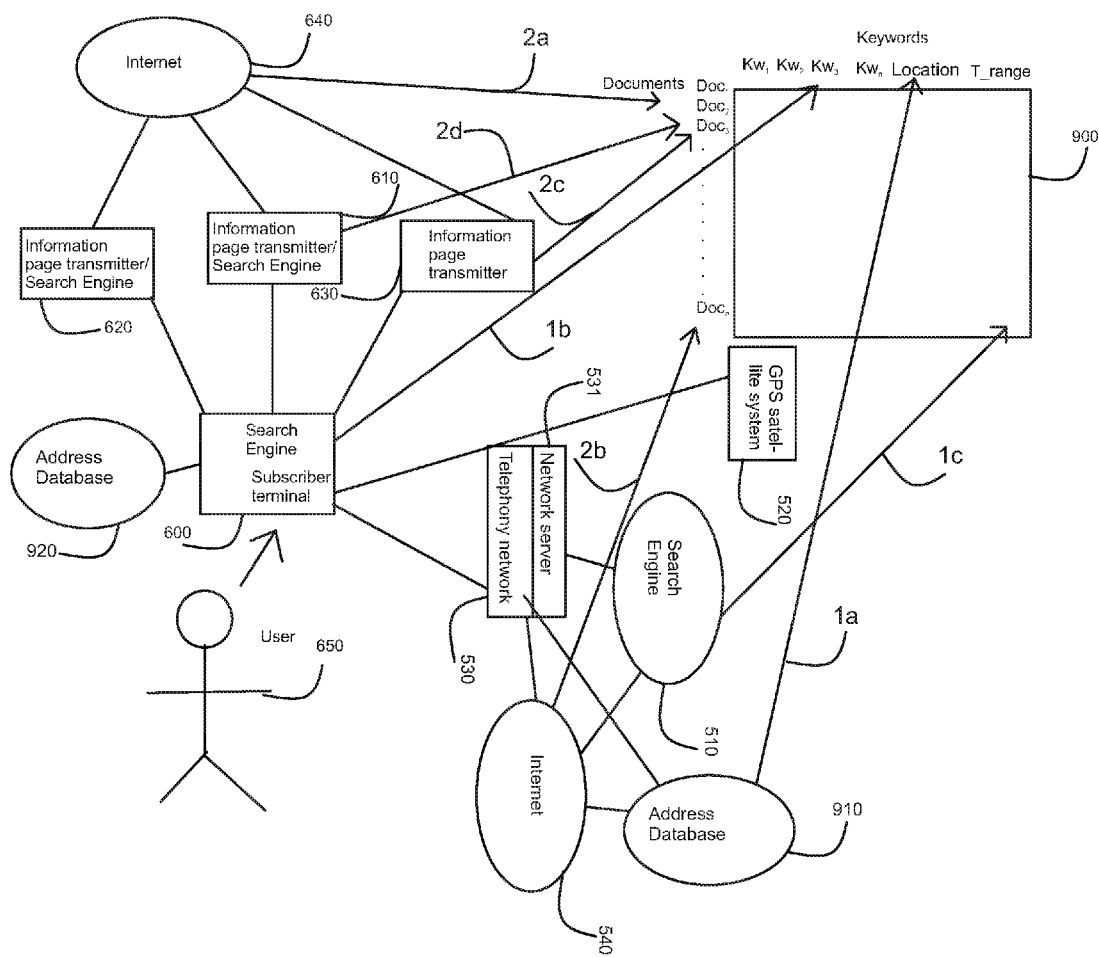
FIG. 10 shows an exemplary embodiment 91 of the invention as a network diagram that displays logical connections of search.

Lastly let us look at FIG. 10 that shows an embodiment 91 of the invention as a network diagram. The search engines at the subscriber terminal and/or the network compose and manage at least one index relationship. The subscriber terminal (600) gets its location from the GPS satellite system (520) or the cellular network, and this is translated to at least one natural language address or range of addresses in the address database (910, 920) on the subscriber terminal or the network. The natural language addresses become query terms that are searched against the keywords in the index (arrows 1a, 1b, 1c), to discover matching documents on the Internet or information page transmitters (arrows 2a, 2b, 2c, 2d). The most matching documents are listed to the user dynamically, and as the subscriber terminal moves and time goes by, or the user enters/changes a user specified search term, this activity is repeated to deliver the most relevant documents to the screen of the subscriber terminal (600). Quite clearly as queries get split and expanded to several parallel queries, and as the parameters change with user motion and time, there will be a lot more queries executed at a higher frequency than in conventional mobile search use today. The future might hold that a user walking on a street generates a hundred queries every 50 m. However, this increased traffic will allow users to identify interesting documents and real life opportunities spontaneously with less amount of effort than ever before.

It should be noted that any features, phases or parts of the embodiment 91 can be freely permuted and combined with embodiments 10, 20, 30, 40, 50, 60, 70, 80 and/or 90 in accordance with the invention.

The invention has been explained above with reference to the aforementioned embodiments and several commercial and industrial advantages have been demonstrated. The methods and arrangements of the invention allow people to scan opportunities passively in the information space as they traverse through space-time in their own context, and receive an alarm of only relevant search results in the physical proximity. The invention facilitates on-demand effortless Mobile Short Range Search that allows the users to access opportunities that they did not know about, or would not have had time to find out about, with minimum effort and cost as the software of the mobile phone is scanning the Internet and information pages for these opportunities and displaying the results dynamically on the mobile phone screen. The invention improves search engine performance for Mobile Search, as the inventive method takes into account the consensual nature of mobile search at a specific location.

The invention has been explained above with reference to the aforementioned embodiments. However, it is clear that the invention is not only restricted to these embodiments, but comprises all possible embodiments within the spirit and scope of the inventive thought and the following patent claims.

REFERENCES

Finding Out About—A Cognitive Perspective on Search Engine Technology and the WWW, Richard K. Belew, Cambridge University Press, ISBN 978-0-521-73446-2. Edition 2008.

WO2009/022356 A2 Method and System for SMS-based Electronic Form Processing, Gadiraju et al.
WO 02/39765, "An electronic short messaging and advertising method and means", Mikko Kalervo Väänänen.
EP09168388.8 & PCT/EP2010/061611, Method and means for data searching and language translation, Mikko Kalervo Väänänen.

The invention claimed is:

1. A search engine system, comprising:
one or more memories storing a search engine process and an index relation for an index; and
one or more processors coupled to the one or more memories and executing the search engine process, receiving queries from at least one mobile station, and using the index relation to calculate a numerical weight to an association between one of (i) at least one specific location of the mobile station and a time of an incoming query from the mobile station and at least one document, and (ii) a time of an incoming query from the mobile station and at least one document, the one or more processors storing into the one or more memories a click-through rate for at least one result of a search based on a frequency at which the result of the search is selected, the one or more processors ranking documents associated with facilities that are open for business at the time of the incoming query higher than documents associated with facilities that are closed at the time of the incoming query,
wherein the search engine system is connected to the mobile station by client software on the mobile station, the search engine system receiving at least one query term and a space-time position of the mobile station by the client software, the search engine system using the received at least one query term and the received space-time position and sending the search result to the client software for display on the mobile station, and
the search engine system causes the client software to navigate to a reservation web page, based on the search result.

2. The search engine system as claimed in claim 1, wherein the search engine system receives, from the at least one mobile station, a query term input by a user via the mobile station, the query term being used by the search engine system as at least a portion of the incoming query, and/or
wherein the search engine system stores into the one or more memories a location of a mobile station as a function of time and/or the query term received from the at least one mobile station.

3. The search engine system as claimed in claim 1, wherein the search engine system includes a web crawler that crawls for keywords pertaining to space-time access relevant information, the space-time access relevant information being one or more of location, opening hours at the location, and price information at the location, and/or
wherein for time-sensitive information, the search engine system alerts to the web crawler to revisit a webpage frequently, and/or
wherein the web crawler crawls webpages for opening times and time ranges of businesses to which the webpages relate.

4. The search engine system as claimed in claim 1, wherein contextual parameters of a user of the at least one mobile station are used for any of the following: adding to the incoming query, and ranking search results, the contextual parameters including one or more of income data and schedule data of the user.

5. The search engine system as claimed in claim 1, wherein documents of the search results are each assigned a relevance by the search engine system, and when the relevance of each of the respective documents exceeds a threshold value, an alert is signaled at the at least one mobile station.

6. The search engine system as claimed in claim 1, wherein numerical location data of the specific location of the at least one mobile station is obtained via one or more of a Global Positioning System (GPS), base stations, and base station or WIFI identities, and the numerical location data is converted to natural language location data search terms used to determine the specific location of the at least one mobile station, and/or
wherein the search engine system stores into the one or more memories the click-through rate of the search result for the specific location of the at least one mobile station.

7. The search engine system as claimed in claim 1, wherein the time of the incoming query is one or more of the current time, the point in time when the incoming query is input at the at least one mobile station or received at the search engine system, and a time indicated in the incoming query.

8. The search engine system as claimed in claim 1, wherein the index contains a vector value that specifies whether a facility matching the search result is open for business or not at the time of the incoming query.

9. The search engine system as claimed in claim 1, wherein the one or more processors ranks documents based on user data, and/or the user data is one or more of a user inbox, system files, and desktop files.

10. The search engine system as claimed in claim 1, wherein the one or more processors derive additional search results based on metadata and contextual user data, the contextual user data being data from one or more of an inbox and desktop files.

11. The search engine system as claimed in claim 1, wherein query parameters of the incoming query are updated by the one or more processors as the at least one mobile station moves in space and time passes.

12. The search engine system as claimed in claim 1, wherein the search engine system generates a plurality of machine-generated queries per one user-generated query, and produces an aggregated search result list of all queries.

13. The search engine system as claimed in claim 1, wherein the search engine system facilitates or allows client software to facilitate filling of online form entry fields, except at least one entry field, which is left blank to receive input from a user to fill in order to authenticate the user.

14. The search engine system as claimed in claim 1, wherein the search result comprises at least one link corresponding to a reservation web page, and
wherein the search engine system transmits said reservation web page to the client software in response to receiving an indication from the client software corresponding to a selection of said reservation web page.

15. A search engine system, comprising:
one or more memories storing a search engine process and an index relation for an index; and
one or more processors coupled to the one or more memories and executing the search engine process, receiving queries from at least one mobile station, and using the index relation to calculate a numerical weight to an association between one of (i) at least one specific location of the mobile station and a time of an incoming query from the mobile station and at least one document, and (ii) a time of an incoming query from the mobile station and at least one document, the one or more processors storing into the one or more memories a click-through rate for at least one result of a search based on a frequency at which the result of the search is selected, the one or more processors ranking documents associated with facilities that are open for business at the time of the incoming query higher than documents associated with facilities that are closed at the time of the incoming query,
wherein the search engine system causes the client software of the mobile station to navigate to a reservation web page, based on the search result.

16. The search engine system as claimed in claim 15, wherein the search engine system receives, from the at least one mobile station, a query term input by a user via the mobile station, the query term being used by the search engine system as at least a portion of the incoming query, and/or
wherein the search engine system stores into the one or more memories a location of a mobile station as a function of time and/or the query term received from the at least one mobile station.

17. The search engine system as claimed in claim 15, wherein the search engine system includes a web crawler that crawls for keywords pertaining to space-time access relevant information, the space-time access relevant information being one or more of location, opening hours at the location, and price information at the location, and/or
wherein for time-sensitive information, the search engine system alerts to the web crawler to revisit the webpage frequently, and/or
wherein the web crawler crawls webpages for opening times and time ranges of businesses to which the webpages relate.

18. The search engine system as claimed in claim 15, wherein contextual parameters of a user of the at least one mobile station are used for any of the following: adding to the incoming query, and ranking search results, the contextual parameters including one or more of income data and schedule data of the user.

19. The search engine system as claimed in claim 15, wherein documents of the search results are each assigned a relevance by the search engine system, and when the relevance of each of the respective documents exceeds a threshold value, an alert is signaled at the at least one mobile station.

20. The search engine system as claimed in claim 15, wherein numerical location data of the specific location of the at least one mobile station is obtained via one or more of a Global Positioning System (GPS), base stations, and base station or WIFI identities, and the numerical location data is converted to natural language location data search terms used to determine the specific location of the at least one mobile station, and/or
wherein the search engine system stores into the one or more memories the click-through rate of the search result for the specific location of the at least one mobile station.

21. The search engine system as claimed in claim 15, wherein the time of the incoming query is one or more of the current time, the point in time when the incoming query is input at the at least one mobile station or received at the search engine system, and a time indicated in the incoming query.

22. The search engine system as claimed in claim 15, wherein the index contains a vector value that specifies whether a facility matching the search result is open for business or not at the time of the incoming query.

23. The search engine system as claimed in claim 15, wherein the one or more processors ranks documents based on user data, and/or the user data is one or more of a user inbox, system files, and desktop files.

24. The search engine system as claimed in claim 15, wherein the one or more processors derive additional search results based on metadata and contextual user data, the contextual user data being data from one or more of an inbox and desktop files.

25. The search engine system as claimed in claim 15, wherein the search engine system is connected to the mobile station by client software on the mobile station, the search engine system receiving at least one query term and a space-time position of the mobile station by the client software, the search engine system using the received at least one query term and the received space-time position and sending the search result to the client software for display on the mobile station.

26. The search engine system as claimed in claim 15, wherein at least two search queries are processed by the search engine system at the same time in parallel.

27. The search engine system as claimed in claim 15, wherein the search result comprises at least one link corresponding to a reservation web page, and
wherein the search engine system transmits said reservation web page to the client software in response to receiving an indication from the client software corresponding to a selection of said reservation web page.

28. A search engine system, comprising:
one or more memories storing a search engine process and an index relation for an index; and
one or more processors coupled to the one or more memories and executing the search engine process, receiving queries from at least one mobile station, and using the index relation to calculate a numerical weight to an association between one of (i) at least one specific location of the mobile station and a time of an incoming query from the mobile station and at least one document, and (ii) a time of an incoming query from the mobile station and at least one document, the one or more processors storing into the one or more memories a click-through rate for at least one result of a search based on a frequency at which the result of the search is selected, the one or more processors ranking documents associated with facilities that are open for business at the time of the incoming query higher than documents associated with facilities that are closed at the time of the incoming query,
wherein at least two search queries are processed by the search engine system at the same time in parallel.

29. The search engine system as claimed in claim 28, wherein the search engine system is connected to the mobile station by client software on the mobile station, the search engine system receiving at least one query term and a space-time position of the mobile station by the client software, the search engine system using the received at least one query term and the received space-time position and sending the search result to the client software for display on the mobile station.

30. The search engine system as claimed in claim 28, wherein the search engine system causes the client software to navigate to a reservation web page, based on the search result.

31. The search engine system as claimed in claim 30, wherein the search result comprises at least one link corresponding to a reservation web page, and
wherein the search engine system transmits said reservation web page to the client software in response to receiving an indication from the client software corresponding to a selection of said reservation web page.

32. A search engine system, comprising:
one or more memories storing a search engine process and an index relation for an index; and
one or more processors coupled to the one or more memories and executing the search engine process, receiving queries from at least one mobile station, and using the index relation to calculate a numerical weight to an association between one of (i) at least one specific location of the mobile station and a time of an incoming query from the mobile station and at least one document, and (ii) a time of an incoming query from the mobile station and at least one document, the one or more processors storing into the one or more memories a click-through rate for at least one result of a search based on a frequency at which the result of the search is selected, the one or more processors ranking documents associated with facilities that are open for business at the time of the incoming query higher than documents associated with facilities that are closed at the time of the incoming query,
wherein the search engine system is connected to the mobile station by client software on the mobile station, the search engine system receiving at least one query term and a space-time position of the mobile station by the client software, the search engine system using the received at least one query term and the received space-time position and sending the search result to the client software for display on the mobile station, and
at least two search queries are processed by the search engine system at the same time in parallel.

* * * * *